(12) United States Patent
Kanekawa et al.

(10) Patent No.: US 7,765,269 B2
(45) Date of Patent: Jul. 27, 2010

(54) COMMUNICATIONS SYSTEM, AND INFORMATION PROCESSING DEVICE AND CONTROL DEVICE INCORPORATING SAID COMMUNICATIONS SYSTEM

(75) Inventors: Nobuyasu Kanekawa, Hitachi (JP); Hiromichi Yamada, Hitachi (JP); Kohei Sakurai, Hitachi (JP); Kotaro Shimamura, Hitachinaka (JP); Yuichiro Morita, Hitachi (JP); Satoshi Tanaka, Tachikawa (JP)

(73) Assignee: Renesas Technology Corporation, Tokyo (JP)

( * ) Notice: Subject to any disclaimer, the term of this patent is extended or adjusted under 35 U.S.C. 154(b) by 303 days.

(21) Appl. No.: 10/980,837

(22) Filed: Nov. 4, 2004

(65) Prior Publication Data

US 2006/0036704 A1    Feb. 16, 2006

(30) Foreign Application Priority Data

Nov. 5, 2003    (JP)    ............................ 2003-376140

(51) Int. Cl.
*G06F 15/16* (2006.01)
(52) U.S. Cl. ...................................... 709/208; 710/110
(58) Field of Classification Search ................. 709/208
See application file for complete search history.

(56) References Cited

U.S. PATENT DOCUMENTS

| | | | | |
|---|---|---|---|---|
| 3,100,294 A | * | 8/1963 | Dryden et al. | ............... 370/537 |
| 4,019,144 A | * | 4/1977 | Lincoln et al. | ................. 326/46 |
| 4,291,333 A | * | 9/1981 | Warnock et al. | ............ 348/621 |
| 4,872,003 A | * | 10/1989 | Yoshida | .................. 340/825.21 |
| 4,933,613 A | * | 6/1990 | Berner et al. | .................. 318/65 |
| 5,928,345 A | * | 7/1999 | Tetzlaff et al. | ............... 710/107 |
| 6,499,067 B1 | * | 12/2002 | Honda | ............................ 710/5 |
| 6,931,470 B2 | * | 8/2005 | Ballantyne et al. | ........... 710/107 |
| 7,003,309 B2 | * | 2/2006 | Suzuki et al. | ................ 455/502 |
| 2003/0033350 A1 | * | 2/2003 | Arimilli et al. | ............... 709/202 |
| 2004/0220948 A1 | * | 11/2004 | Whitaker | ..................... 707/100 |

FOREIGN PATENT DOCUMENTS

JP    61-166244    7/1986

OTHER PUBLICATIONS

The I2C-Bus Specification, Version 2.1. Philips Semiconductors, Jan. 2000.*
Kalinsky, David and Roee Kalinsky. "Introduction to Serial Peripheral Interface". Embedded.com: Feb. 1, 2002. pp. 1-3.*
Kalinsky, David and Roee Kalinsky. "Introduction to I2C". Embedded.com: Jul. 31, 2001. pp. 1-3.*
"MC68HC11A8 Technical Data". Motorola, Inc.: 1996. pp. 1-158.*
Data Sheet TLE 6230 GP, V2.1, Aug. 26, 2002, pp. 1-16.

* cited by examiner

*Primary Examiner*—Shawki S Ismail
*Assistant Examiner*—Christopher Biagini
(74) *Attorney, Agent, or Firm*—Townsend and Townsend and Crew LLP

(57) ABSTRACT

This invention provides communications systems that enable broadcasting while making use of the simplicity of the prior art and also provides control devices and information processing systems incorporating the communications system. In this invention, chip-select signals are provided for transmitting (TXCSi) and receiving (RXCSi) independently as well as for individual chips as in the prior art. That is, a group of signals indicating whether or not a slave node is selected as the node to transmit signals to a master node and the direction of communications are output from the master node to the slave node.

18 Claims, 22 Drawing Sheets

FIG. 4

| CASE | TXCSi# 1 | TXCSi# 2 | TXCSi# n | RXCSi# 1 | RXCSi# 2 | RXCSi# n | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|---|---|
| 1 | OFF | OFF | OFF | * | * | * | INACTIVE | INACTIVE | INACTIVE | - | - | - |
| 2 | ON | OFF | OFF | * | * | * | ACTIVE | INACTIVE | INACTIVE | - | - | - |
| 3 | OFF | ON | OFF | * | * | * | INACTIVE | ACTIVE | INACTIVE | - | - | - |
| 4 | ON | ON | OFF | * | * | * | ACTIVE | ACTIVE | INACTIVE | - | - | - |
| 5 | OFF | OFF | ON | * | * | * | INACTIVE | INACTIVE | ACTIVE | - | - | - |
| 6 | ON | OFF | ON | * | * | * | ACTIVE | INACTIVE | ACTIVE | - | - | - |
| 7 | OFF | ON | ON | * | * | * | INACTIVE | ACTIVE | ACTIVE | - | - | - |
| 8 | ON | ON | ON | * | * | * | ACTIVE | ACTIVE | ACTIVE | - | - | - |
| 9 | * | * | * | OFF | OFF | OFF | - | - | - | INACTIVE | INACTIVE | INACTIVE |
| 10 | * | * | * | ON | OFF | OFF | - | - | - | ACTIVE | INACTIVE | INACTIVE |
| 11 | * | * | * | OFF | ON | OFF | - | - | - | INACTIVE | ACTIVE | INACTIVE |
| 12 | * | * | * | ON | ON | OFF | - | - | - | INHIBIT | INHIBIT | INACTIVE |
| 13 | * | * | * | OFF | OFF | ON | - | - | - | INACTIVE | INACTIVE | ACTIVE |
| 14 | * | * | * | ON | OFF | ON | - | - | - | INHIBIT | INHIBIT | INHIBIT |
| 15 | * | * | * | OFF | ON | ON | - | - | - | INHIBIT | INHIBIT | INHIBIT |
| 16 | * | * | * | ON | ON | ON | - | - | - | INHIBIT | INHIBIT | INHIBIT |
| 17 | ON | OFF | OFF | OFF | OFF | OFF | ACTIVE | INACTIVE | INACTIVE | INACTIVE | INACTIVE | INACTIVE |
| 18 | OFF | OFF | OFF | ON | OFF | OFF | INACTIVE | INACTIVE | INACTIVE | ACTIVE | INACTIVE | INACTIVE |
| 19 | ON | ON | OFF | ON | OFF | OFF | ACTIVE | ACTIVE | INACTIVE | ACTIVE | INACTIVE | INACTIVE |
| 20 | OFF | OFF | OFF | OFF | OFF | ON | INACTIVE | INACTIVE | INACTIVE | INACTIVE | INACTIVE | INACTIVE |
| 21 | ON | ON | ON | OFF | OFF | ON | ACTIVE | ACTIVE | ACTIVE | INACTIVE | INACTIVE | ACTIVE |

*: DON'T CARE

FIG. 6

| CASE | CS# 1 | CS# 2 | CS# n | T/TR# | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|
| 1 | OFF | OFF | OFF | T | INACTIVE | INACTIVE | INACTIVE | INACTIVE | INACTIVE | INACTIVE |
| 2 | ON | OFF | OFF | T | ACTIVE | INACTIVE | INACTIVE | INACTIVE | INACTIVE | INACTIVE |
| 3 | OFF | ON | OFF | T | INACTIVE | ACTIVE | INACTIVE | INACTIVE | INACTIVE | INACTIVE |
| 4 | ON | ON | OFF | T | ACTIVE | ACTIVE | INACTIVE | INACTIVE | INACTIVE | INACTIVE |
| 5 | OFF | OFF | ON | T | INACTIVE | INACTIVE | ACTIVE | INACTIVE | INACTIVE | INACTIVE |
| 6 | ON | OFF | ON | T | ACTIVE | INACTIVE | ACTIVE | INACTIVE | INACTIVE | INACTIVE |
| 7 | OFF | ON | ON | T | INACTIVE | ACTIVE | ACTIVE | INACTIVE | INACTIVE | INACTIVE |
| 8 | ON | ON | ON | T | ACTIVE | ACTIVE | ACTIVE | INACTIVE | INACTIVE | INACTIVE |
| 9 | OFF | OFF | OFF | TR# | INACTIVE | INACTIVE | INACTIVE | INACTIVE | INACTIVE | INACTIVE |
| 10 | ON | OFF | OFF | TR# | ACTIVE | INACTIVE | INACTIVE | ACTIVE | INACTIVE | INACTIVE |
| 11 | OFF | ON | OFF | TR# | INACTIVE | ACTIVE | INACTIVE | INACTIVE | ACTIVE | INACTIVE |
| 12 | ON | ON | OFF | TR# | ACTIVE | ACTIVE | INACTIVE | INHIBIT | INHIBIT | INACTIVE |
| 13 | OFF | OFF | ON | TR# | INACTIVE | INACTIVE | ACTIVE | INACTIVE | INACTIVE | ACTIVE |
| 14 | ON | OFF | ON | TR# | ACTIVE | INACTIVE | ACTIVE | INHIBIT | INACTIVE | INHIBIT |
| 15 | OFF | ON | ON | TR# | INACTIVE | ACTIVE | ACTIVE | INACTIVE | INHIBIT | INHIBIT |
| 16 | ON | ON | ON | TR# | ACTIVE | ACTIVE | ACTIVE | INHIBIT | INHIBIT | INHIBIT |

FIG. 8

| CASE | CS# 1 | CS# 2 | CS# n | R/TR# | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|
| 1 | OFF | OFF | OFF | R | INACTIVE | INACTIVE | INACTIVE | INACTIVE | INACTIVE | INACTIVE |
| 2 | ON | OFF | OFF | R | ACTIVE | INACTIVE | INACTIVE | ACTIVE | INACTIVE | INACTIVE |
| 3 | OFF | ON | OFF | R | INACTIVE | ACTIVE | INACTIVE | INACTIVE | ACTIVE | INACTIVE |
| 4 | ON | ON | OFF | R | ACTIVE | ACTIVE | INACTIVE | | INHIBIT | |
| 5 | OFF | OFF | ON | R | INACTIVE | INACTIVE | ACTIVE | INACTIVE | INACTIVE | ACTIVE |
| 6 | ON | OFF | ON | R | ACTIVE | INACTIVE | ACTIVE | | INHIBIT | |
| 7 | OFF | ON | ON | R | INACTIVE | ACTIVE | ACTIVE | | INHIBIT | |
| 8 | ON | ON | ON | R | ACTIVE | ACTIVE | ACTIVE | | INHIBIT | |
| 9 | OFF | OFF | OFF | TR# | INACTIVE | INACTIVE | INACTIVE | INACTIVE | INACTIVE | INACTIVE |
| 10 | ON | OFF | OFF | TR# | ACTIVE | INACTIVE | INACTIVE | ACTIVE | INACTIVE | INACTIVE |
| 11 | OFF | ON | OFF | TR# | INACTIVE | ACTIVE | INACTIVE | INACTIVE | ACTIVE | INACTIVE |
| 12 | ON | ON | OFF | TR# | ACTIVE | ACTIVE | INACTIVE | | INHIBIT | |
| 13 | OFF | OFF | ON | TR# | INACTIVE | INACTIVE | ACTIVE | INACTIVE | INACTIVE | ACTIVE |
| 14 | ON | OFF | ON | TR# | ACTIVE | INACTIVE | ACTIVE | | INHIBIT | |
| 15 | OFF | ON | ON | TR# | INACTIVE | ACTIVE | ACTIVE | | INHIBIT | |
| 16 | ON | ON | ON | TR# | ACTIVE | ACTIVE | ACTIVE | | INHIBIT | |

FIG. 19

| CASE | TXCS# 1 | TXCS# 2 | TXCS# n | RXCS# 1 | RXCS# 2 | RXCS# n | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|---|---|
| 1 | OFF | OFF | OFF | * | * | * | INACTIVE | INACTIVE | INACTIVE | INACTIVE | INACTIVE | INACTIVE |
| 2 | ON | OFF | OFF | * | * | * | ACTIVE | INACTIVE | INACTIVE | ACTIVE | INACTIVE | INACTIVE |
| 3 | OFF | ON | OFF | * | * | * | INACTIVE | ACTIVE | INACTIVE | INACTIVE | ACTIVE | INACTIVE |
| 4 | ON | ON | OFF | * | * | * | INHIBIT | INHIBIT | INHIBIT | INHIBIT | INHIBIT | INHIBIT |
| 5 | OFF | OFF | ON | * | * | * | INACTIVE | INACTIVE | ACTIVE | INACTIVE | INACTIVE | ACTIVE |
| 6 | ON | OFF | ON | * | * | * | INHIBIT | INHIBIT | INHIBIT | INHIBIT | INHIBIT | INHIBIT |
| 7 | OFF | ON | ON | * | * | * | INHIBIT | INHIBIT | INHIBIT | INHIBIT | INHIBIT | INHIBIT |
| 8 | ON | ON | ON | * | * | * | INHIBIT | INHIBIT | INHIBIT | INHIBIT | INHIBIT | INHIBIT |

THIS EMBODIMENT

COMMUNICATIONS SYSTEM, AND INFORMATION PROCESSING DEVICE AND CONTROL DEVICE INCORPORATING SAID COMMUNICATIONS SYSTEM

FIELD OF THE INVENTION

This invention relates to a communications system, and more particularly to a communications system that enables high-speed communications within an information processing device and a control device, and also to a control device and a processing system incorporating said communication system.

BACKGROUND OF THE INVENTION

There has been a communications standard and mode known as the SPI (Serial Peripheral Interface) for communications channel within a control device, particularly for communications between a micro-processing unit and peripheral I/Os. Examples of a peripheral I/O (an output driver) are disclosed in the Literature of Data Sheet TLE4230 GP, Infineon Technologies AG, Bereichs Kommunikation (28 Aug. 2000) and other documents. The prior art for transmitting serial data in sync with a clock is disclosed in FIG. 15 of Japanese Patent Laid-Open No. S61 (1986)-166244.

SUMMARY OF THE INVENTION

The SPI is an excellent mode realizable with simple hardware and software because it makes arbitration prior to the communication unnecessary by fixing the master node and the slave node to be a communication partner is selected using a chip-select signal.

Specifically, the SPI selects a slave node using a slave node selection signal (a chip-select signal) and performs both transmitting and receiving between a master node and a selected slave node simultaneously. However, since the SPI is designed to deal with the communications between a micro-processing unit and a peripheral I/O, it only supports one-to-one communications and does not support one-to-many communications, or broadcast communications. If attempting to activate chip-select signals for multiple slave nodes in order to realize broadcast communications, transmission signals from the master node may be received in respective slave nodes, but transmitting data from multiple slave nodes to the master node may cause a problem such as a collision of signals.

The point of the widely adopted autonomous distributed control is that nodes for performing control share information. Accordingly broadcast capability is necessary for information sharing. Furthermore, it goes without saying that broadcast capability is also required for communications between multiple micro-processing units, not between a micro-processing unit and peripheral I/Os. According to the method illustrated in FIG. 15 of Japanese Patent Laid-Open No. S61 (1986)-166244, it seems possible to realize broadcast by activating the signals RQI1 and RQI2. However, the slave CPUs output RQO signals (RQO1 and RQO2 signals at a master CPU) individually, which may cause a collision of the serial signals SO sent from slave CPUs to the master CPU.

The above-mentioned prior art needs further consideration to increase the processing speed of a microprocessor. The prior art must activate a communication interface to receive data. Since the data transfer speed of a communication interface is much slower than the operation speed of a microprocessor, it takes along time to transfer data. Microprocessor technologies have made remarkable progress in recent years and microprocessors with over 1 GHz clock speed have been on the market. In contrast, the data transfer speed between semiconductor chips is limited to about 10 MHz-100 MHz, which is one to two digits times slower than the operation of modern microprocessors. Therefore, if a communication interface is activated at the time when receiving data is necessary for processing by a microprocessor, the microprocessor cannot proceed to the next operation until the receiving operation is finished, which becomes a bottleneck blocking faster processing.

Since the microprocessor also has to transmit signals for receiving data, receiving data in the background is impossible.

In view of those problems with the prior art, the first object of this invention is to provide a communications system that realizes the broadcast capability while taking advantage of the simplicity of the prior art. The second object of this invention is to provide a communications system suitable for high-performance microprocessors that will not become a bottleneck blocking the increase of microprocessor speed. The third object of this invention is to provide a communications interface that will not require transmitting signals for receiving data.

To achieve the first and third objects above, this invention enables the outputting of signals to select either transmitting or receiving operation, in addition to the slave node selection signal (the chip-select signal). In other words, a group of communication selection signals are output to slave nodes, indicating whether or not each node is selected as a communication partner of a master node, and also indicating the direction of communications between the master node and slave nodes such as one-way, two-way.

Various methods of encoding those communication selection signals group are conceivable and they can be roughly divided into the following two methods:

(1) Methods of providing selection signals (chip-select signals) for each of the transmitting and receiving operations.

(2) Methods of providing selection signals indicating the direction of communications in addition to the slave node selection signals (chip-select signals)

a. EXAMPLE 1

Selection signal indicating the direction of communications=L: receiving operation Selection signal indicating the direction of communications=H: simultaneous transmitting and receiving operations b. EXAMPLE 2

Selection signal indicating the direction of communications=L: transmitting operation Selection signal indicating the direction of communications=H: simultaneous transmitting and receiving operations c. EXAMPLE 3

Selection signal indicating the directions of communications=L: transmitting operation Selection signal indicating the directions of communications=H: receiving operation d. EXAMPLE 4

Selection signal indicating the direction of communications (H, L): transmitting operation Selection signal indicating the direction of communications=(L, H): receiving operation Selection signal indicating the direction of communications=(H, H): simultaneous transmitting and receiving operations The methods (1) are more flexible than the methods (2) since the direction of communications between the master node and slave nodes can be selected for each slave node.

A communications system according to this invention on the above methods (1) comprises a single master node and a plurality of slave nodes, and performs communications between the master node and the slave nodes. The master node comprises: a clock transmission means that outputs a clock signal to the slave nodes; a means for outputting a first selection signal, that is indicating whether or not the slave nodes are selected as a communication partner of receiving data from the master node, to each of said slave nodes; a means for outputting a second selection signal, that can not select two or more slave nodes simultaneously and that is indicating whether or not any one of said slave nodes is selected as a communication partner of transferring data to said master node, to each of said slave nodes; a means for outputting data from the master node to the slave nodes in sync with the clock signal; and a means for taking in the data from the slave nodes in sync with a clock signal.

Each of the plurality of slave nodes comprises a means for taking in the data outputted from said master node in sync with a clock signal when a first selection signal has selected the slave node and a means for outputting data to said master node in sync with a clock signal when a second selection signal has selected the slave node.

A control device according to this invention comprises: a single master node; a plurality of slave nodes; an actuator connected to the slave nodes via a switching means; and a communications system that performs communications between the master node and the slave nodes, the actuator being controlled by the commands from the master node.

An information processing system according to this invention comprises: a single master node that has a microprocessor and performs information processing; a plurality of slave nodes each of which has a microprocessor and performs information processing; and a communications system that performs communications between the master node and the slave nodes.

According to this invention, multiple slave nodes can receive signals transmitted from the master node and no collision occurs between signals transmitted from the slave nodes to the master node. Accordingly, broadcast capability can be realized. Also, it is possible to operate a transmitting function and a receiving function independently.

Furthermore, in order to achieve the second subject, the operation of the receiving function for a communication interface has been periodically activated and received data has been transferred to memory in advance. This enables the microprocessor to read received data transferred to memory in advance and continue the processing whenever it needs received data. Because of this, the fast processing capability of the microprocessor is not hampered by the time required to transfer received data, which improves its performance.

BRIEF DESCRIPTION OF THE DRAWINGS

FIG. 4 is a schematic diagram showing the setting and communication operation of the TXCSi# and RXCSi#.

FIG. 6 is a schematic diagram showing the setting and communication operation of the CSi# and T/TR#.

FIG. 8 is a schematic diagram showing the setting and communication operation of the CSi# and R/TR#.

FIG. 19 is a diagram showing an embodiment of the operation of a master node compatible with the conventional SPI.

DESCRIPTION OF THE PREFERRED EMBODIMENTS

The preferred embodiments of this invention are described hereinafter in reference to the accompanying drawings.

Figure 1:
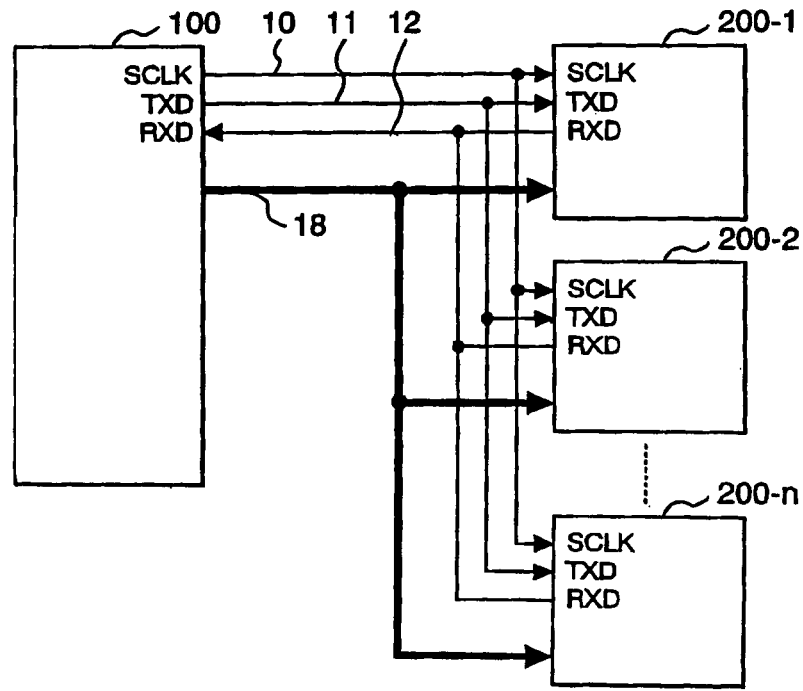
FIG. 1 is a block diagram showing the basic principle of a communication system according to this invention.

FIG. 1 shows the basic principle of a communications system according to this invention. The master node 100 is connected to the slave nodes 200-1 to 200-$n$ via signal lines (SCLK10, TXD11, RXD12, and communication selection signal group 18). The TXD11 is a transmitting signal from the master node (main processor) 100 to the slave nodes (I/O processors) 200-1 to 200-$n$. The RXD12 is a receiving signal from one of the slave nodes (I/O processors) 200-1 to 200-$n$ to the master node (main processor) 100. The sclk10 shows a clock for transferring the TXD11 and RXD12. For example, the TXD11 and RXD12 are output at the leading edge of the SCLK10 and the TXD11 and RXD12 are latched at the trailing edge of the SCLK10, and vice versa i.e. the TXD11 and RXD12 are output at the trailing edge of the SCLK10 and the TXD11 and RXD12 are latched at the leading edge of the SCLK10.

The communication selection signal group 18 is a group of signals indicating whether or not one of the slave nodes 200-1 to 200-$n$ is selected as a signal communication partner of the master node 100 and the direction of communications. The slave node to be a destination of the TXD11, the slave node able to output the RXD12, and the like are specified by the communication selection signal group 18. How they are specified by the communication selection signal group 18 is illustrated in the embodiments shown in FIGS. 2 to 8.

Figure 2:
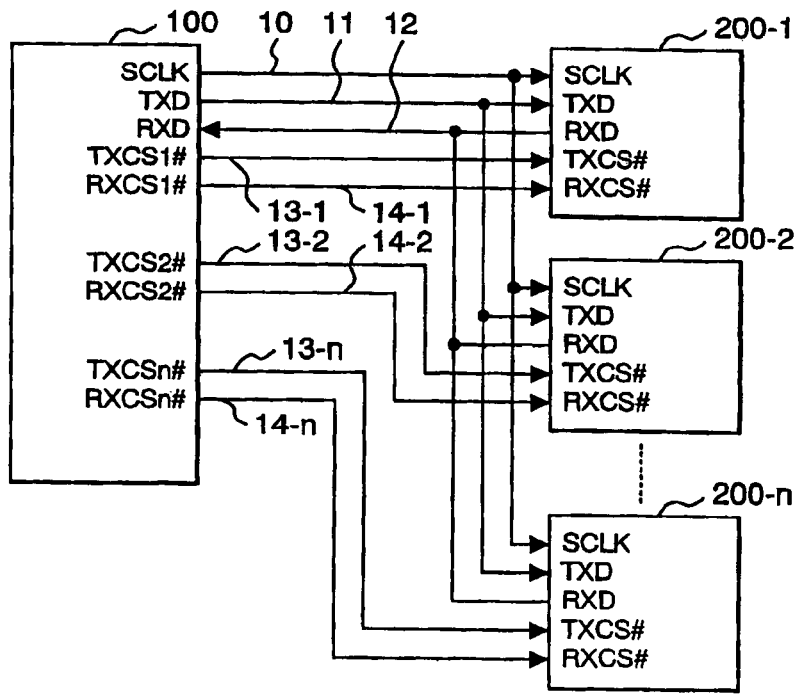
FIG. 2 is a diagram showing an embodiment for controlling the communications by means of the TXCSi# and RXCSi#.

FIG. 2 shows an embodiment wherein the communication selection signal group consists of TXCS1#(13-1) to TXCSn#(13-$n$) and RXCS1#(14-1) to RXCSn#(14-$n$). The master node 100 is connected to the slave nodes 200-1 to 200-$n$ via signal lines (SCLK10, TXD11, RXD12, TXCS1#(13-1) to TXCSn#(13-$n$), and RXCS1#(14-1) to RXCSn#(14-$n$)). The # added to the terminal of each signal name indicates that that signal is active-low, i.e. a signal which is active at "L" level.

Since the threshold value for recognizing "L" is low in a TTL (Transistor-Transistor Logic) logic circuit, it does not occur almost that a signal level is erroneously recognized as "L" due to electrical noise. Taking advantage of this characteristic, active-low signals are commonly used as strobe signals, chip-select signals, and the like in order to increase noise resistance, as in this embodiment. If a logic circuit whose threshold value for recognizing "H" level is higher than normal is used or if it is not necessary to pay particular attention to noise resistance, it is possible to use an active-high signal, i.e. a signal which is active at H level. The embodiments described herein use active-low signals for chip-select signals.

The TXD11 is a transmitting signal from the master node 100 to the slave nodes 200-1 to 200-$n$ and the RXD12 is a receiving signal from one of the slave nodes 200-1 to 200-$n$.

The TXCS1#(13-1) to TXCSn#(13-$n$) are chip-select signals for the transmitting signal TXD11 and indicate that the transmitting signal TXD11 is for the corresponding slave node. They indicate, for example, when the TXCS1#(13-1) is active ("L"), the transmitting signal TXD11 is the signal for the slave node 200-1. More than one signals of the TXCS1#(13-1) to TXCSn#(13-$n$) can be active ("L").

The RXCS1#(14-1) to RXCSn#(14-$n$) are chip-select signals for the receiving signal RXD12 and indicate that the corresponding slave node outputs the RXD12. They indicates, for example, when the RXCS1#(14-1) is active ("L"), only the slave node 200-1 outputs the RXD12. If more than one slave nodes output the RXD12 simultaneously the signals collide. Therefore, more than one signals of the RXCS1#(14-1) to RXCSn#(14-$n$) cannot be active ("L").

Figure 3:
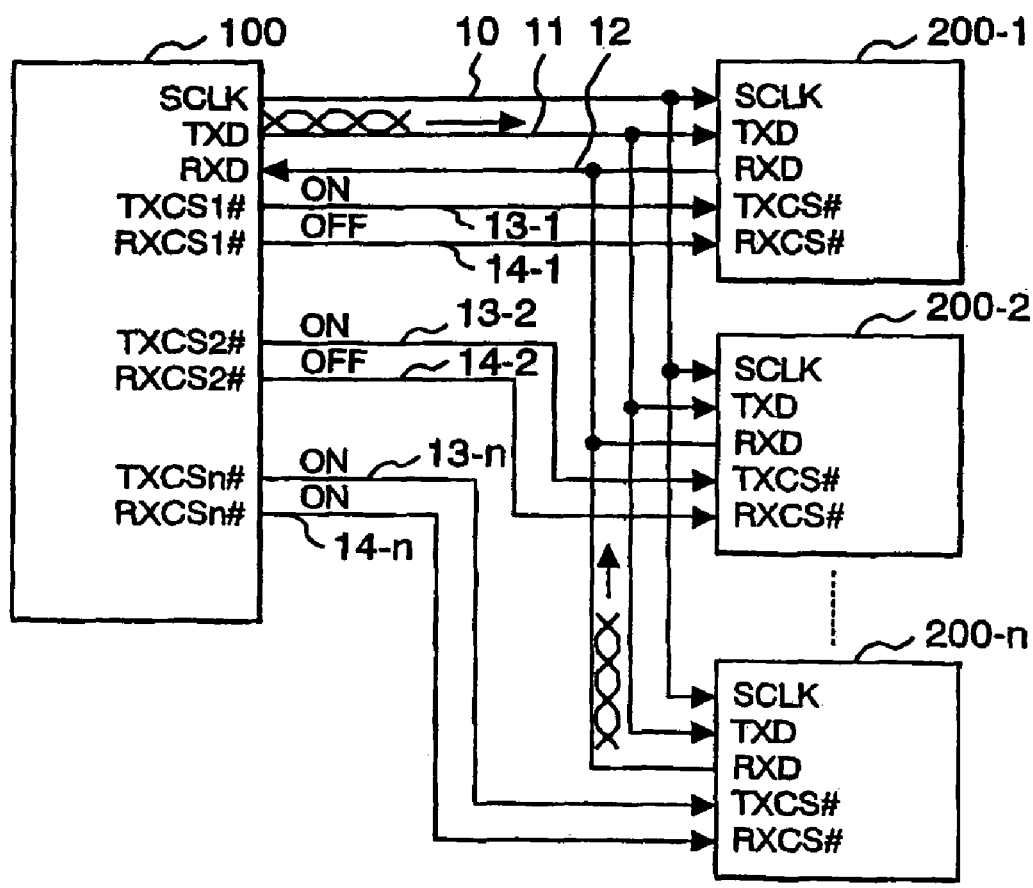
FIG. 3 is a diagram showing an example operation (broadcast) of the communication system shown in FIG. 2.

FIG. 3 shows an example of the operation of the communications system illustrated in FIG. 2. In this embodiment, the TXCS1#(13-1) to TXCSn#(13-$n$) are all ON ("L") and only the RXCSn#(14-$n$) of the RXCS1#(14-1) to RXCSn#(14-$n$) is ON ("L") and the others OFF ("H"). This indicates that The TXD11 is for all the slave nodes 200-1 to 200-$n$ and only the slave node 200-$n$ outputs the RXD12. Thus, according to this embodiment the master node 100 can transmit information to all the slave nodes 200-1 to 200-$n$ and can receive a signal from the particular slave node 200-$n$ at the same time.

FIG. 4 shows the setting method and communication operation of the TXCS1#(13-1) to TXCSn#(13-$n$) and the RXCS1#(14-1) to RXCSn#(14-$n$) of this invention: ON indicates active ("L") and OFF indicates inactive ("H").

The TXCS1#(13-1) to TXCSn#(13-$n$) can be combined freely, as shown in the cases 1 to 8. The RXCS1#(14-1) to RXCSn#(14-$n$) can be combined so that only one of them is ON, as shown in the cases 9 to 16. Concerning the RXCS1#(14-1) to RXCSn#(14-$n$), a combination in which more than one signal of them are ON is inhibited because the receiving signals from slaves collide.

It is possible that the master node transfers data to a slave node but that all the slave nodes don't transfer data as shown in the case 17, and vice versa i.e. one of the slave nodes transfers data to the master node but the master node does not transfer data to all the slave nodes as shown in the case 18. It is also possible that the master node transfers data to all the slave nodes and a particular slave node transfers data to the master node as shown in the case 19. The master node can exchange data with the slave node to which the master node transfers data with one to one as usual as shown in the case 20. Further, the master node can receive data from one slave node different from the other slave node to which the master node transfers data as shown in the case 21.

Figure 5:
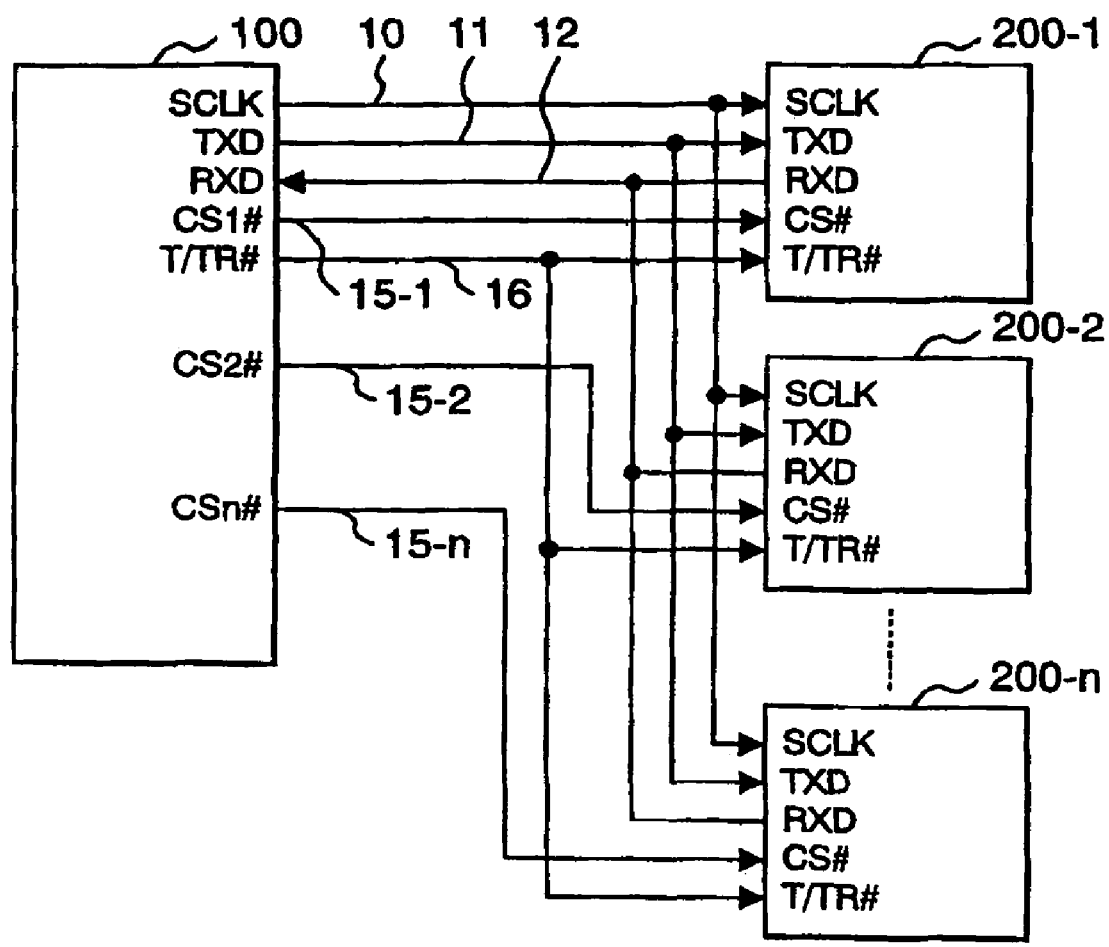
FIG. 5 is a diagram showing an embodiment for controlling communications by means of the CSi# and the T/TR#.

FIG. 5 is an embodiment of this invention wherein the communication selection signal group 18 comprises the CS1#(15-1) to CSn#(15-$n$) and the T/TR#(16). The signal lines CS1#(15-1) to CSn#(15-$n$) are chip-select signals for corresponding slave nodes. Since this embodiment employs the active low logic, these signals CS1#(15-1) to CSn#(15-$n$) are active when they are "L", indicating that a corresponding slave node is/are selected as a communication partner of the master node. The signal line T/TR#(16) is a signal indicating the direction of communications. When this signal is at "H" level, a transferring (transmitting) operation from the master node 100 to the slave nodes 200-1 to 200-$n$ is active. When it is at "L" level, both the transferring (transmitting) operation from the master node 100 to the slave nodes 200-1 to 200-$n$ and that (receiving) from the slave nodes 200-1 to 200-$n$ to the master node 100 are active.

These two level signals control communications between the master node 100 and the slave nodes 200-1 to 200-$n$ as shown in FIG. 6. As shown in the cases 1 to 8, when the T/TR#(16) is T, or at "H" level, only a transferring (transmitting) operation from the master node 100 to the slave nodes 200-1 to 200-$n$ is active. At this time, transmitting data to any one of multiple slave nodes is possible. When the T/TR#(16) is TR, or at "L", as shown in the cases 9 to 16, only one slave node 200-$i$ can be selected as a communication partner of the master node in order to avoid collisions of data from the slave nodes 200-1 to 200-$n$ to the master node 100.

Figure 7:
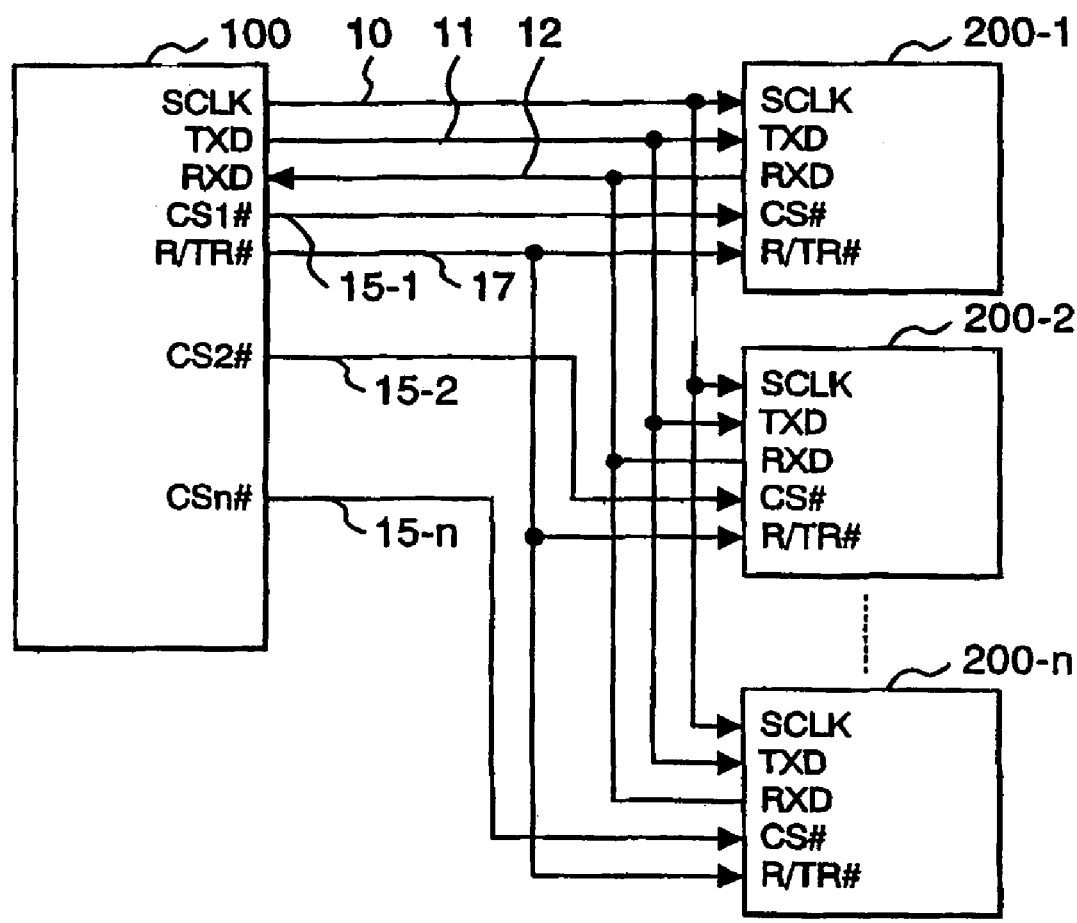
FIG. 7 is a diagram showing an embodiment for controlling communications by means of the CSi# and R/TR#.

FIG. 7 shows an embodiment of this invention wherein the communication selection signal group 18 comprises the signal lines CS1#(15-1) to CSn#(15-n) and R/TR#(17). The signal lines CS1#(15-1) to CSn#(15-n) are chip-select signals for corresponding slave nodes. Since this embodiment employs the active low logic, when these signals CS1#(15-1) to CSn#(15-n) are at "L", the corresponding slave node is/are selected as a communication partner of the master node. The R/TR#(17) is a signal indicating the direction of communications. When this signal is at "H" level, the transferring (receiving) operation from the slave nodes 200-1 to 200-n to the master node 100 is active. When this signal is at "L" level, both a transferring (transmitting) operation from the master nods to the slave nodes 200-1 to 200-n and that (receiving) from the slave nodes 200-1 to 200-n to the master node 100 are active.

These two level signals control the communications between the master node 100 and the slave nodes 200-1 to 200-n as shown in FIG. 8. As shown in the cases 1 to 8, when the R/TR#(17) is R, or at "H" level only the transferring (receiving) from the slave nodes 200-1 to 200-n to the master node 100 is active. When the R/TR#(17) is TR#, or at "L" level, both the transferring (transmitting) operation from the master node 100 to the slave nodes 200-1 to 200-n and that (receiving) from the slave nodes 200-1 to 200-n to the master node 100 is active as shown in the cases 9 to 16. In either case, only one slave node 200-i can be selected as a communication partner of the master node in order to avoid collisions of data transferring (receiving) from the slave nodes 200-1 to 200-n to the master node 100.

Figure 9:
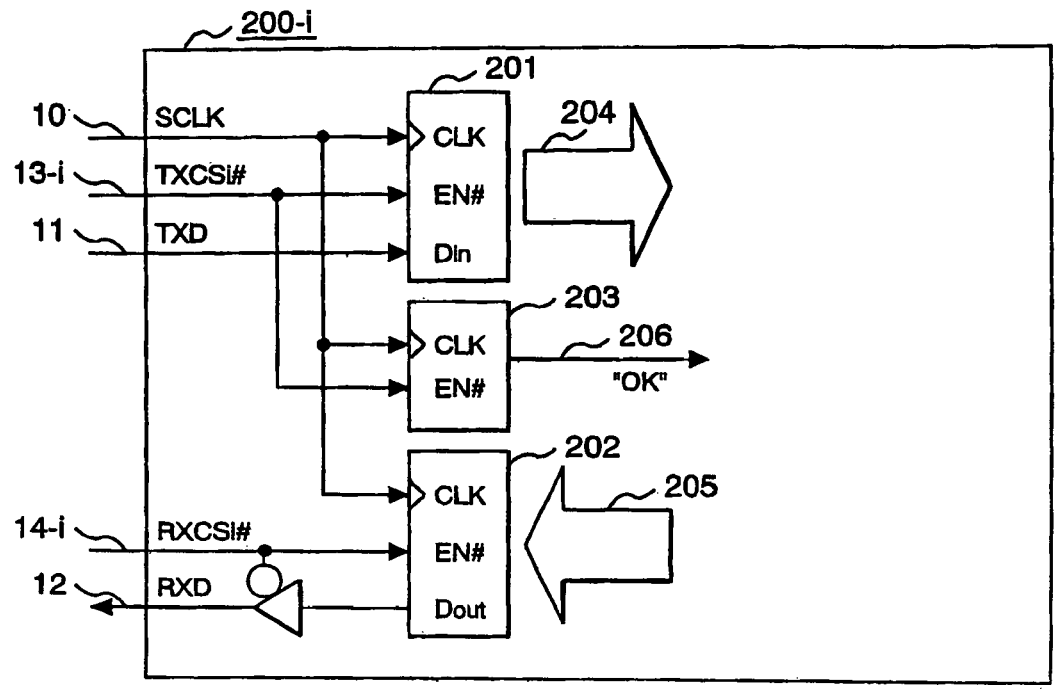
FIG. 9 is a diagram showing an embodiment of a slave node.

FIG. 9 is a diagram showing an example of slave node construction. This slave node 200-i is equipped with a serial/parallel converter 201 and a parallel/serial converter 202. The serial/parallel converter 201 converts the TXD11 sent as serial data to parallel data 204 according to SCLK10 when the TXCSi# is active (at "L"). The parallel/serial converter 202 converts parallel data 205 to serial data according to SCLK10 and outputs it as RXD12. This slave node can also have a state transition monitor 203. The state transition monitor 203 calculates the number of the SCLK10 that were input during the period when the TXCSi# is continuously active (at "L"), and outputs "OK" as a monitor result 206 if the number is a prescribed value.

Figure 10:
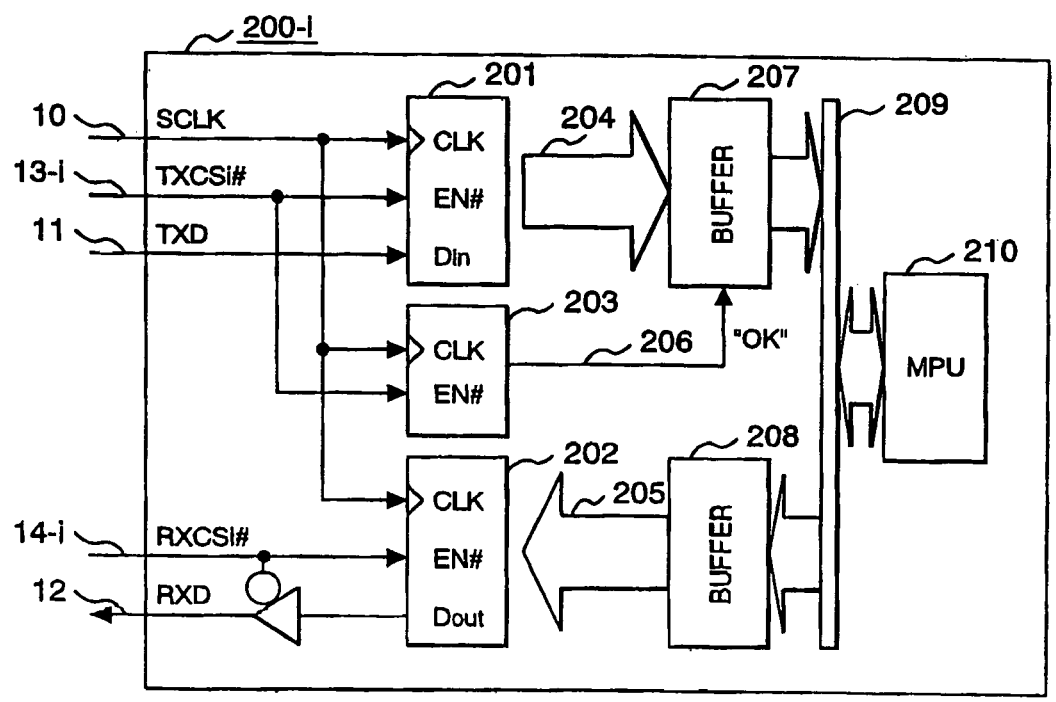
FIG. 10 is a diagram showing an embodiment of a slave node containing a micro-processing unit.

FIG. 10 is a diagram showing another example of slave node construction. A slave node 200-i in this embodiment has an MPU (Micro-processing Unit) 210. The received data that has been converted to parallel data 204 by the serial/parallel converter 201 is stored in a buffer 207 when the number of SCLK10 arrives at prescribed value as the monitor result 206 of the state transition monitor 203. The data stored in the buffer 207 is read out by the MPU 210 via a bus 209 according to the request of the MPU 210. Transmitted data is written to a buffer 208 by the MPU 210 via a bus 209, input to the parallel/serial converter 202 as parallel data 205 to convert to serial data, and then outputted as RXD12. Furthermore, it is possible to realize an information processing device specifically suitable for distributed control by providing a storage device not shown in this figure inside or outside of the slave node 200-i and connecting the master node and the plurality of slave nodes 200-1 to 200-n through a communications system or communications channel provided by this invention. Ordinary semiconductor memory or a magnetic disk unit can be used for the storage device.

The master node 100 and the slave nodes 200-1 to 200-n perform their allocated processing individually using the storage device. And they can exchange necessary information via a communications system provided by this invention and realize totally integrated operations. Particularly, according to the communications system provided by this invention, it can realize the broadcast of information from the master node 100 to the slave nodes 200-1 to 200-n, and the simultaneous transmitting and receiving to and from different slave nodes are possible. Thereby the efficiency of communications for information exchange between nodes can be increased.

For example, high-performance information processing can be realized as a distributed processing system as a whole, by transmitting from the master node 100 to the slave nodes 200-1 to 200-n such information as numeric values with which individual slave nodes perform arithmetic operations and information representing the type of arithmetic operation, and by transmitting from the slave nodes 200-1 to 200-n to the master node 100 such information as the results of arithmetic operations and states of arithmetic operations (operating, completed, error, etc.).

Figure 11:
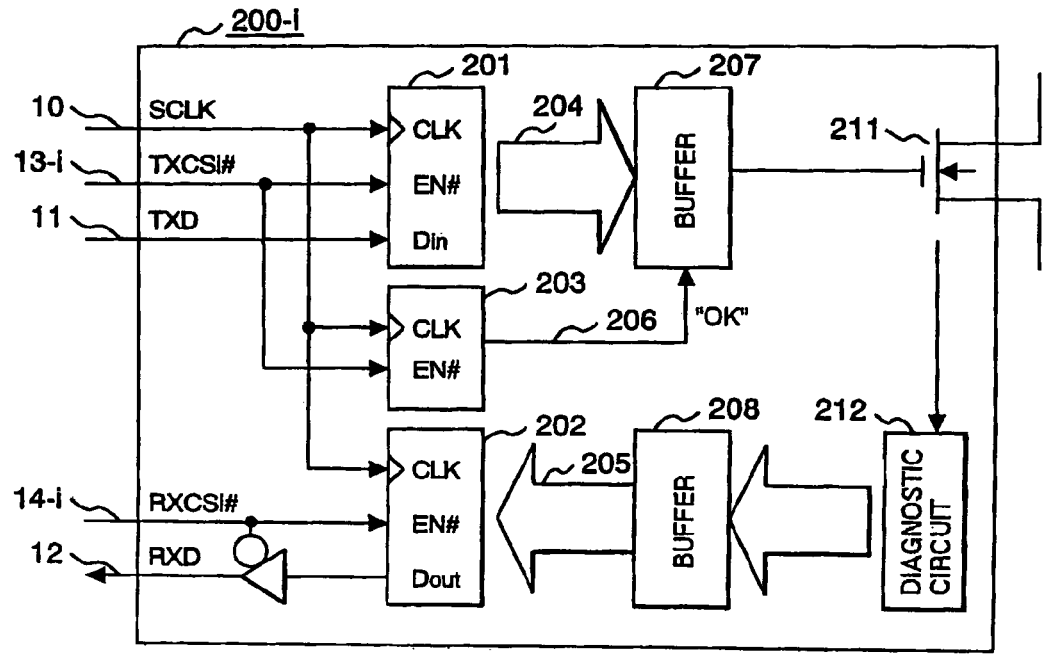
FIG. 11 is a diagram showing an embodiment of a slave node containing an output semiconductor device.

FIG. 11 shows an embodiment of this invention wherein the slave node 200-i has an output semiconductor device 211. The received data that has been converted to the parallel data 204 by the serial/parallel converter 201 is stored in the buffer 207 upon arrival of prescribed number of SCLK10 as the monitor results 206 of the state transition monitor 203. The output semiconductor device 211 operates based on the data stored in the buffer 207. The output semiconductor device 211 drives an actuator not shown in this figure to control objects. It goes without saying that the output semiconductor device 211 can be a high-side driver which is connected at the power supply side of the actuator or can be a low-side driver which is connected at the ground side of the actuator. Also, the output semiconductor device can be an H bridge or the like.

A diagnostic circuit 212 diagnoses the output semiconductor device. The diagnosis results are written to a buffer 208, input to the parallel/serial converter 202 as parallel data 205 to convert to serial data, and then output as RXD12. The diagnosis items include over-current detection, short circuit between output terminal and power supply, short circuit between output terminal and ground, temperature increase, and removal of load. Over-current can be detected by monitoring output currents. Short between output terminal and power supply short between output terminal and ground, and removal of load can be detected by monitoring a voltage at the output terminal when the output semiconductor device 211 is open. Temperature increase can be detected by means of the PN Junction voltage at a built-in temperature detection diode. Since these technologies are provided by prior arts including those disclosed in the Infineon Technologies, BTS840S2 Data Sheet (http://www.infineon.com/cmc_upload/documents/008/583/Bts840S2_2.pdf) and are not the characteristics of this invention, a detailed description is not given herein.

Other information to be transferred from the slave nodes 200-1 to 200-n to the master node 100 includes the information on the states of the actuator and the controlled objects, which is input from sensors not shown in this figure, and the states (such as error information on control operations and control, and state transition information etc.) of the slave nodes 200-1 to 200-n.

Although only one output semiconductor device 211 is shown in the figure, the slave node 200-i can have a plurality of output semiconductor device 211. In this case, the buffer 207 may be designed to store multiple-bit data, and each output semiconductor device is controlled based on its corresponding bit.

Figure 12:
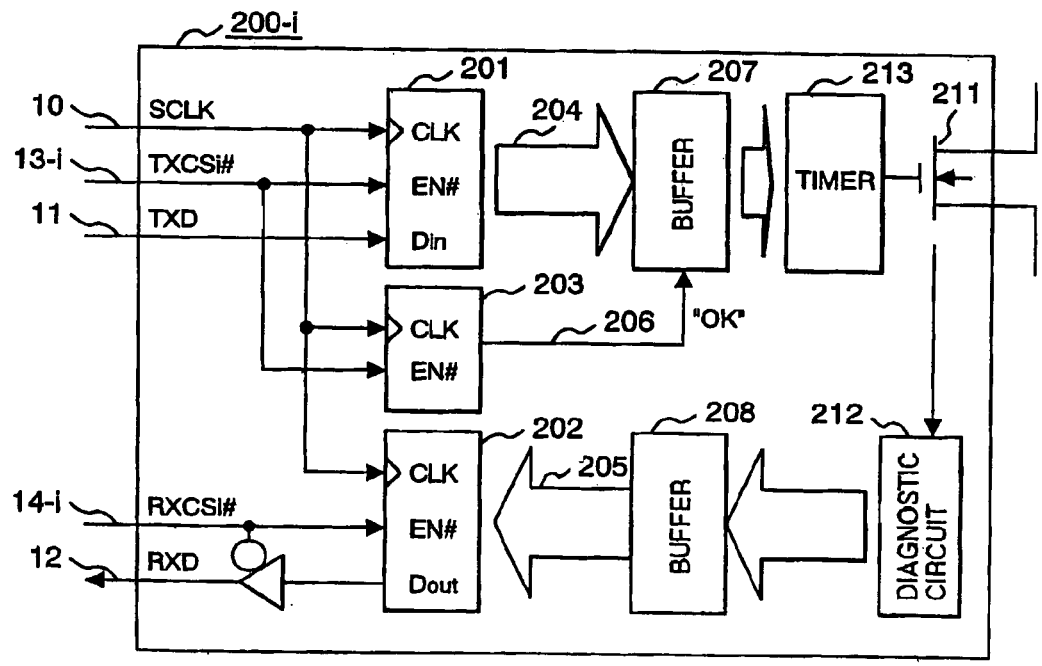
FIG. 12 is a diagram showing an embodiment of a slave node that operates a timer-activated output semiconductor device.

FIG. 12 is an embodiment of a slave node wherein the output semiconductor device is operated by a timer. The received data that has been converted to the parallel data 204 by the serial/parallel converter 201 is stored in the buffer 207 upon arrival of prescribed number of the SCLK 10 as the monitor results of the state transition monitor 203. A timer 213 operates based on the data stored in the buffer 207 and controls the output semiconductor device 211. PWM, pulse generation, and the like are conceivable as the operation of the timer 213. A period, a duty cycle, etc. of the PWM operation are set based on the data stored in the buffer 207, and pulse generation time of the pulse generation operation is set based on the data in the buffer 207.

Although FIGS. 11 and 12 show the embodiments wherein the output semiconductor device 211 is contained in the slave node 200-i, an embodiment wherein the output semiconductor device 211 is externally connected to the slave node 200-i and controlled by the slave node 200-i is also possible. This embodiment will be described later in FIG. 20.

Figure 13:
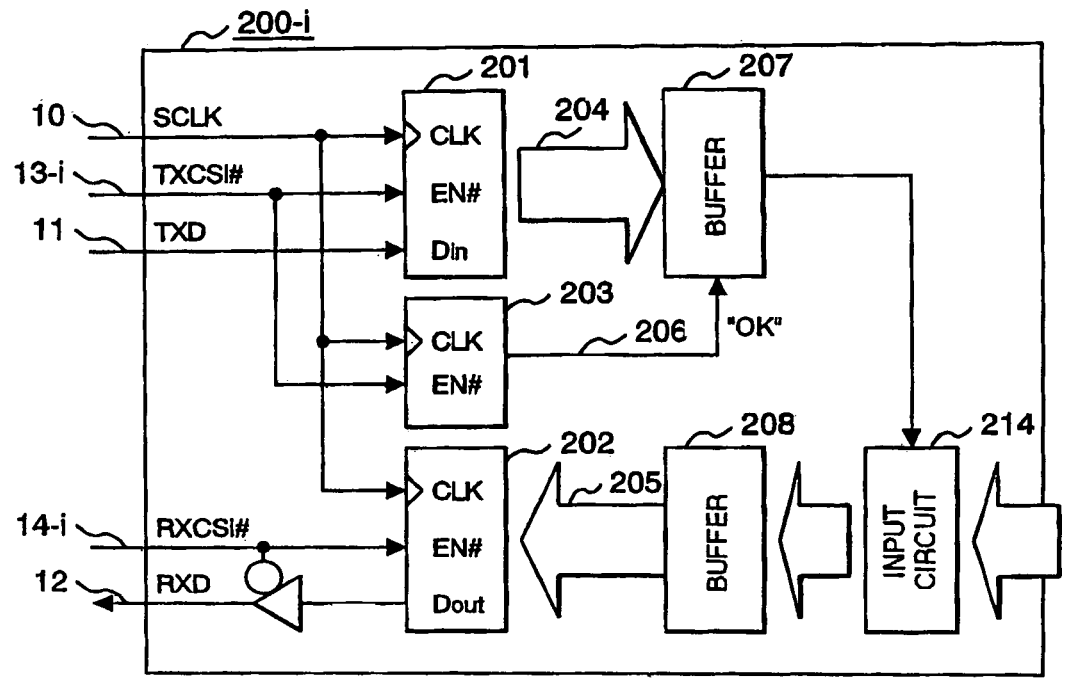
FIG. 13 is a diagram showing an embodiment of a slave node containing an input circuit.

FIG. 13 shows an embodiment of this invention wherein the slave node 200-i has an input circuit 214. Externally input signals are written to a buffer 208 via the input circuit 214, input to the parallel/serial converter 202 as parallel data 205 to convert to serial data, and then output as the RXD12.

Latch circuit, filter circuit for noise removal, multiplexer circuit, and the like are conceivable as the input circuit 214. The latch circuit is a circuit that holds the value of an input signal at a certain moment that varies with time. For analog signals, it is also called a sample & hold circuit. The filter circuit typically comprises resistors and capacitors. Conceivable filter circuit includes a digital circuit that generates frequency characteristics by performing digital operations and a circuit that determines the prescribed value when multiple latched values match. The multiplexer is a kind of switch and needed when dealing with signals more than the number of bits of the buffer 208 as inputs. Suppose the buffer 208 is, for example, 8 bit long. In this case, switching four inputs to a one-bit output and inputting it to the buffer 208 is allowed to deal with 32 inputs, three times the number of bits of the buffer 208.

The data stored in the buffer 207 is used to control the input circuit 214. For example, if the input circuit 214 is a latch circuit the latch timing is controlled, if a filter circuit the selection of filter time constant is controlled, and if a multiplexer circuit switching the multiplexer is controlled, by the data stored in the buffer 207.

Figure 14:
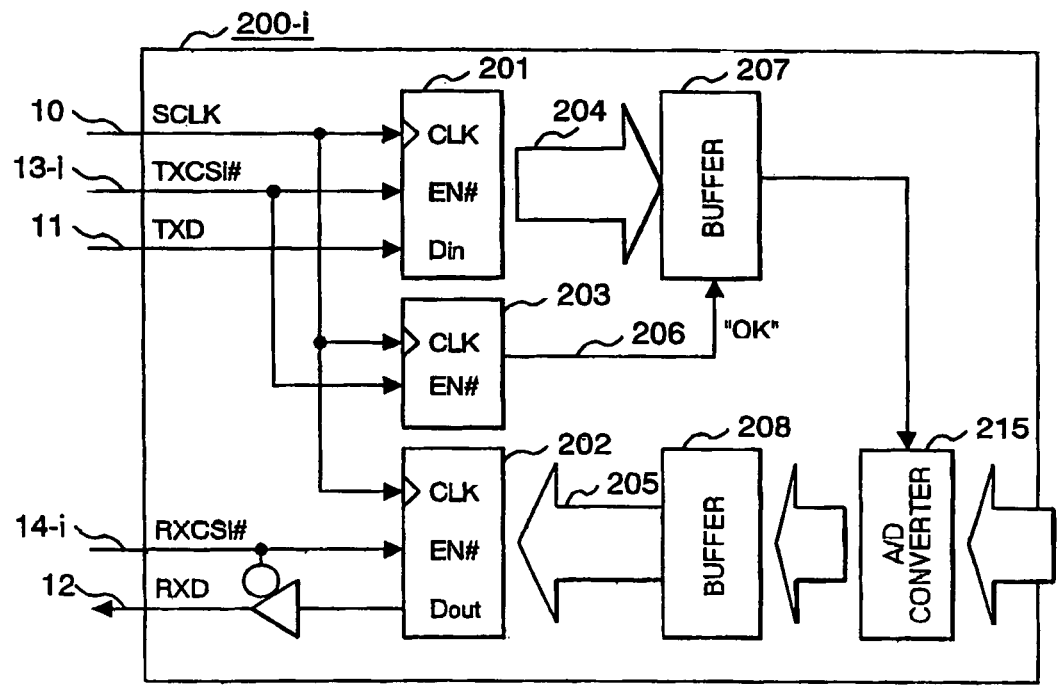
FIG. 14 is a diagram showing an embodiment of a slave node containing an A/D converter.

FIG. 14 shows an embodiment of a slave node having an A/D converter. The signals input externally are converted to digital data by an A/D converter 215 to write to the buffer 208, input to the parallel/serial converter 208 as parallel data 205 to convert to serial data, and then output to as RXD12. The A/D converter 215 is controlled by the data stored in the buffer 207. For example, the data stored in the buffer 207 starts a conversion or sets the conversion mode such as continuous conversion or single conversion.

Figure 15:
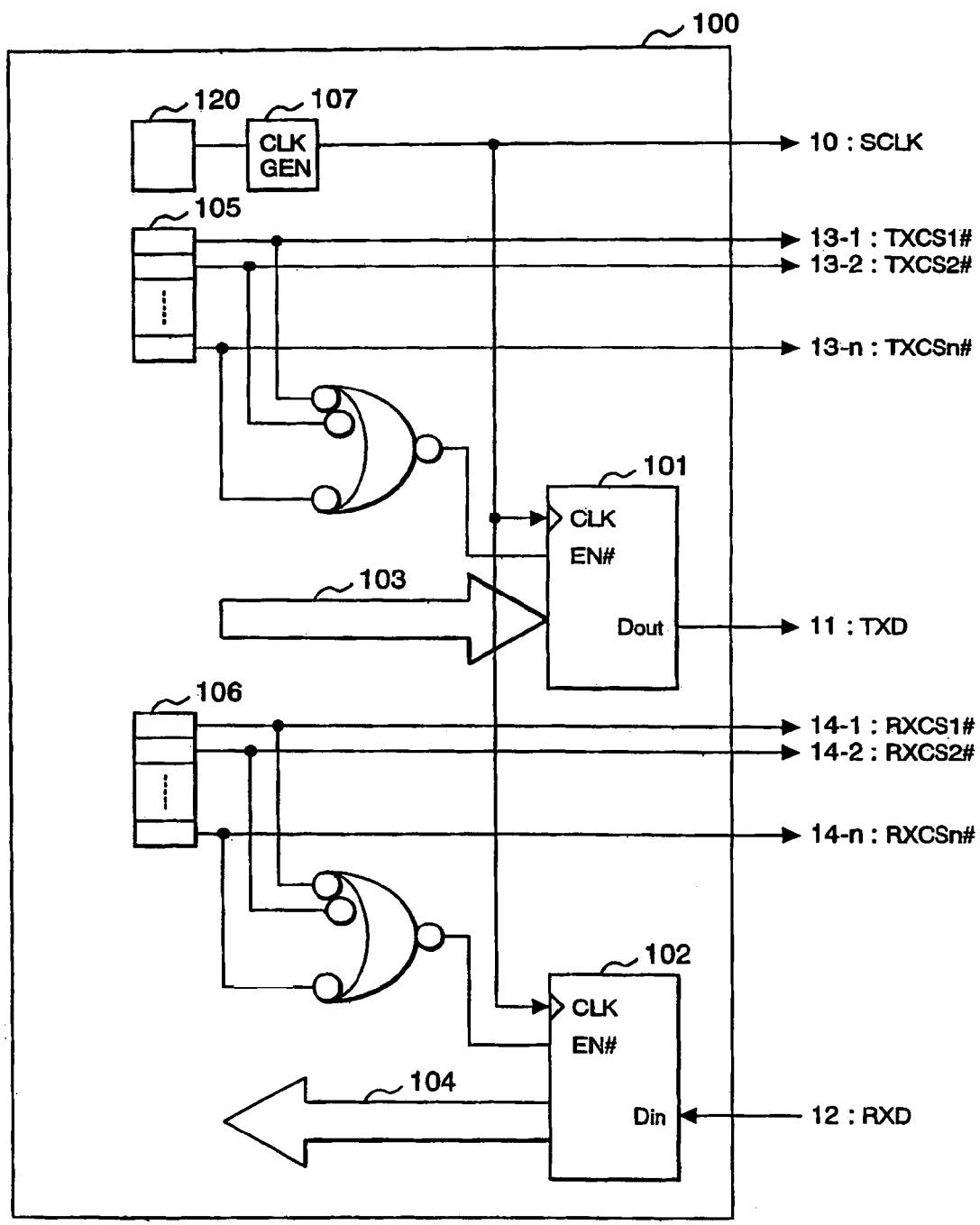
FIG. 15 is a diagram showing an embodiment of a master node.

FIG. 15 is a diagram showing an example of master node construction. This master node 100 comprises a parallel/serial converter 101, a serial/parallel converter 102, a transmitting destination control register 105, a receiving destination control register 106, a clock generation circuit 107, and a communication start register 120.

Destination(s) for transmitting data and a destination for receiving data can be specified by setting in the transmitting destination control register 105 and the receiving destination control register 106 respectively. In this case, of the TXCS1#(13-1) to TXCSn#(13-n) and the RXCS1#(14-1) to RXCSn#(14-n), the signal line corresponding to the setting in the register becomes active ("L"). The receiving destination control register 106 is a register to specify whether or not individual slave nodes 200-1 to 200-n are to be selected as a source from which the master node receives data (transmission from the slave nodes to the master node). In order to avoid contention of receiving data, this register is set so that only one slave node is selected as a source and the other slave nodes are not selected. Also, the register can be configured so as to select only one slave node as a source.

Transmitting data is input to the parallel/serial converter 101 as parallel data converted to serial data according to SCLK10 when a transmitting destination is specified in the transmitting destination control register 105, and then transferred as TXD11. Receiving data RXD12 is input to the serial/parallel converter 102 and converted to parallel data 104 according to the SCLK10 when a receiving destination is specified in the receiving node control register 106.

The SCLK10 is generated by the clock generation circuit 107, drives the parallel/serial converter 101 and the serial/parallel converter 102, and output to the outside of the master node 100. The clock generation circuit 107 generates prescribed number of clocks by setting the communication start register 120 and clears the communication start register 120.

In order to perform communications using the master node 100 in this embodiment, transmitting destination(s) and a receiving destination are set in the transmitting destination control register 105 and the receiving destination control register 106 respectively, and transmitting data is input to the parallel/serial converter 101 as parallel data. Then, the communication start register 120 is set to start communications. Finally, the received data is output from the serial/parallel converter 102 as parallel data 104.

Figure 16:
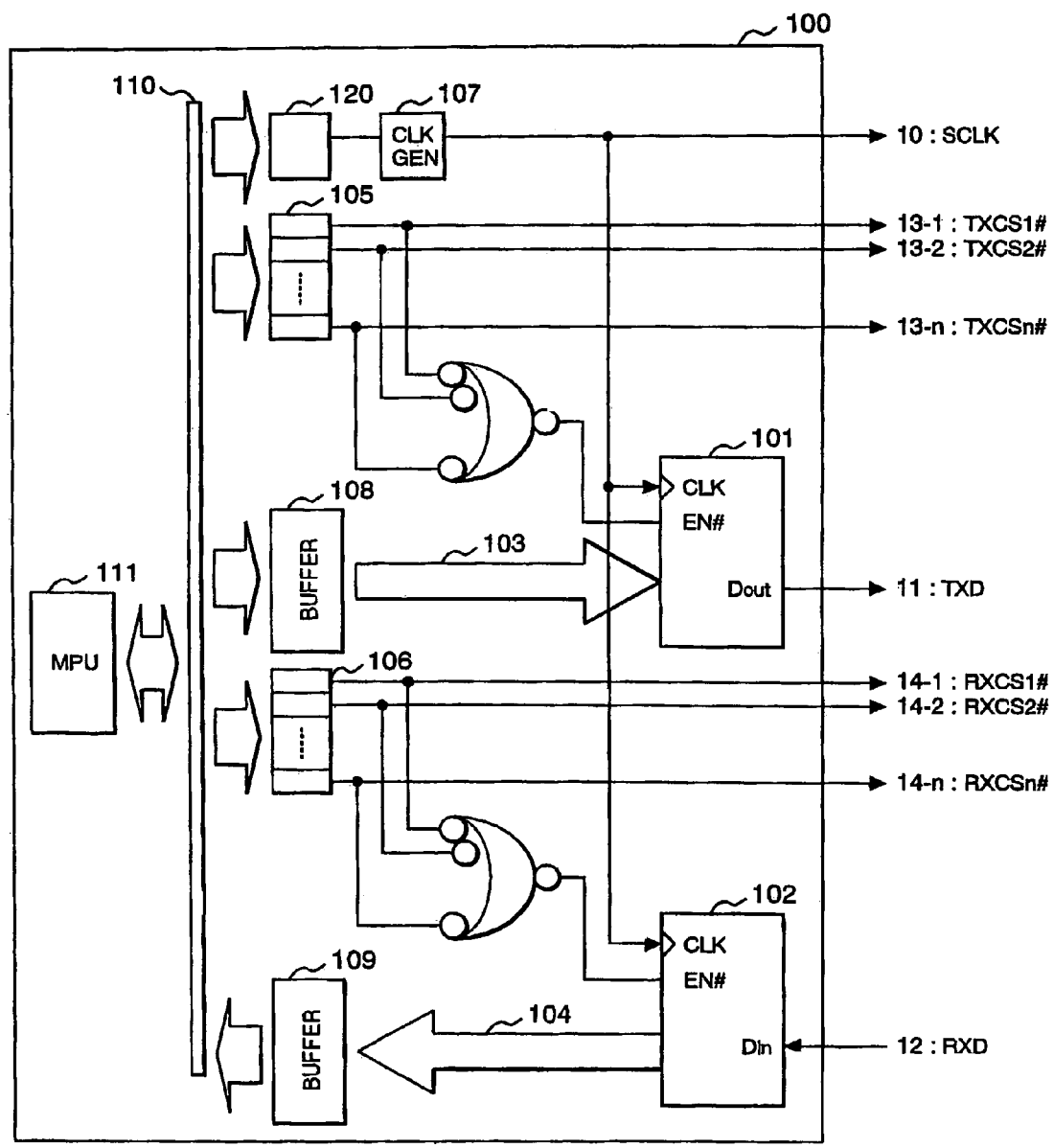
FIG. 16 is a diagram showing a master node containing a micro-processing unit.

FIG. 16 is a diagram showing another example of master node construction. This master 100 has an MPU (Microprocessing Unit) 111. The transmitting destination control register 105, the receiving destination control register 106, and the communication start register 120 are set by the MPU 111 via a bus 110.

Transmitted data is written to a buffer 108 by the MPU 111 via the bus 110, input to the parallel/serial converter 101 as parallel data 102, and converted to serial data to output as TXD11. The receiving data converted to parallel data 104 by the serial/parallel converter 102 is stored in a buffer 109 and read out by the MPU 111 via the bus 110 according to the request of the MPU 111.

Figure 17:
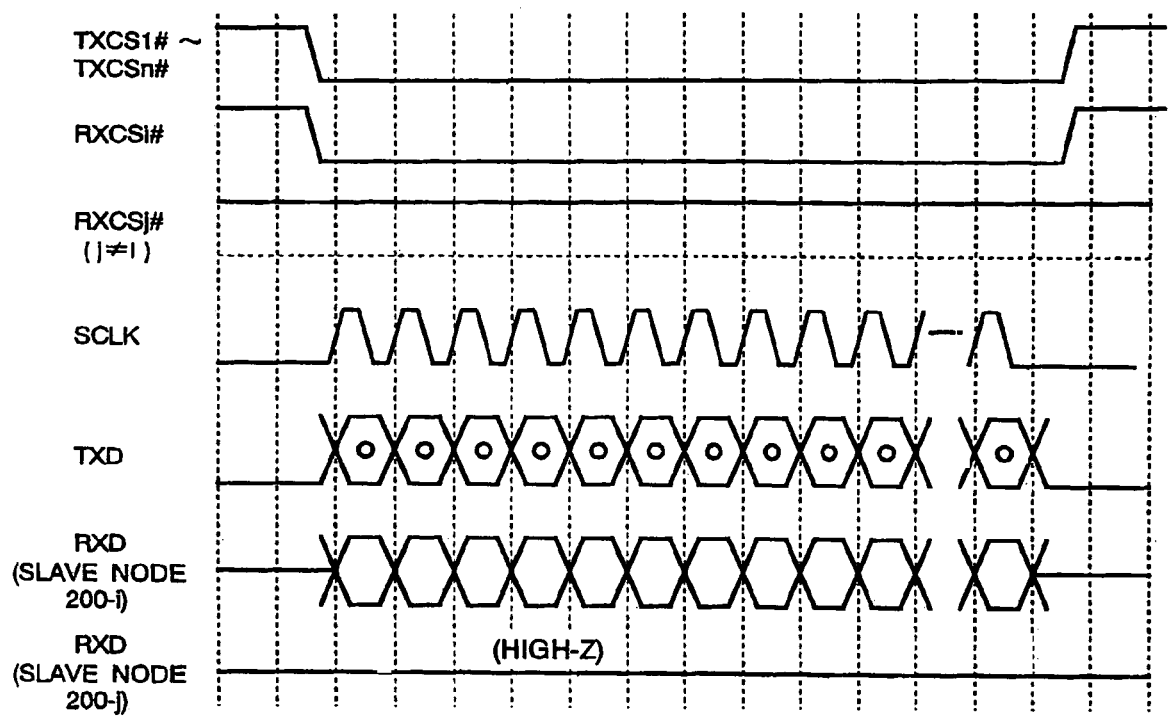
FIG. 17 is a schematic diagram showing the waveforms of a communications system according to this invention.

FIG. 17 is a schematic diagram of signal waveforms of a communications system according to this invention. To specify a transmitting destination and a receiving destination prior to communications, the TXCS1#(13-1) to TXCSn#(13-n) and the RXCS1#(14-1) to RXCSn#(14-n) are output. The example in FIG. 17. shows the case where the TXCS1#(13-1) to TXCSn#(13-n) are all active ("L"), RXCSi#(14-i) of the RXCS1#(14-1) to RXCSn#(14-n) is active ("L") and the other chip select signals are not active.

At this time, the TXD11 is transferred from the master node 100 at the leading edge of the SCLK10 and the slave nodes 200-1 to 200-n latch the TXD11 at the trailing edge of the SCLK10. Only the slave node 200-i transfers the RXD12 at the leading edge of the SCLK10 and the other slave nodes do not output it and become high-impedance state. In this way, the master node can transmit data simultaneously to the slave node 200-1 to 200-n and receive data from the specific slave node 200-i.

Figure 18:
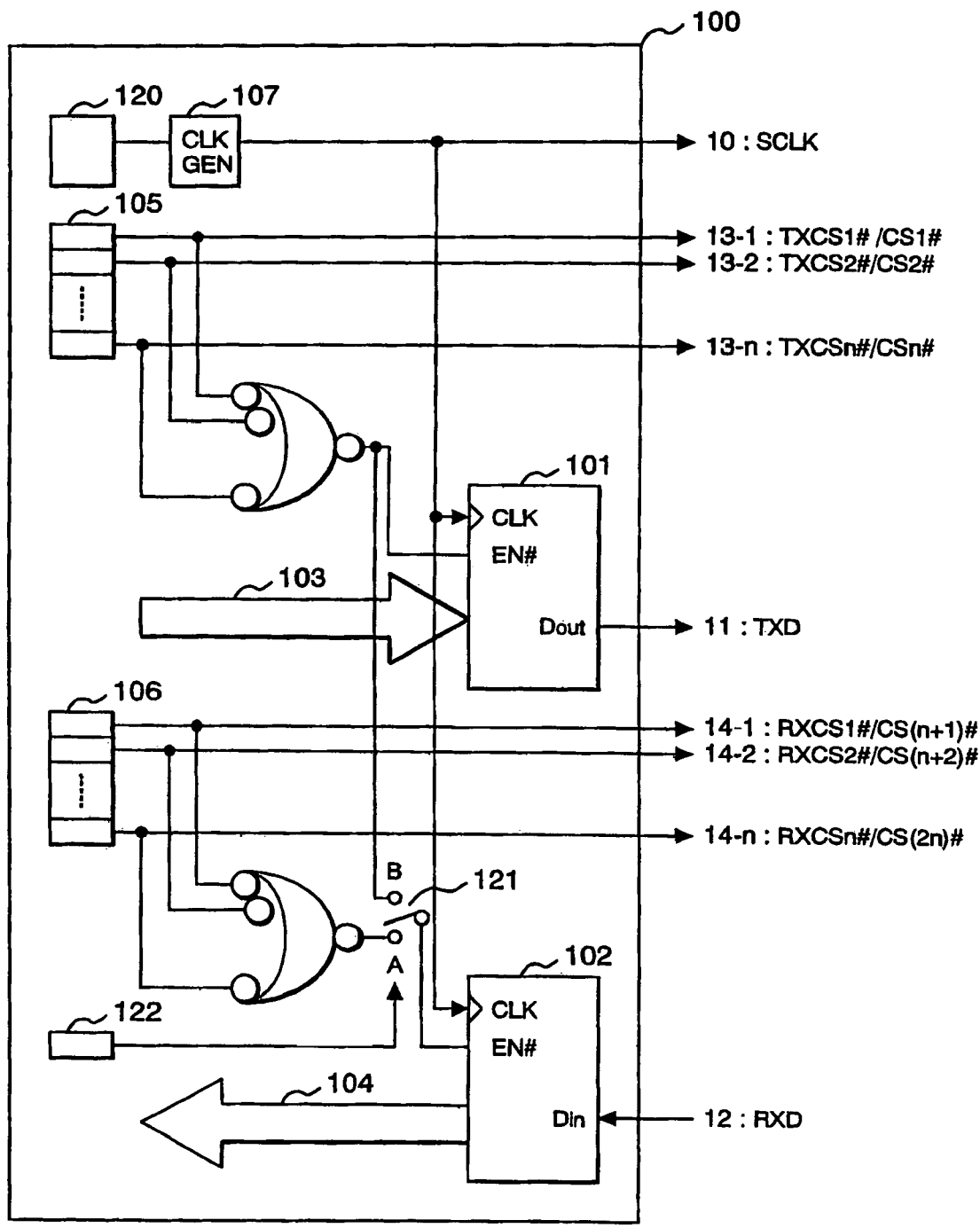
FIG. 18 is a diagram showing an embodiment of a master node compatible with the conventional SPI.

FIG. 18 is a diagram showing an example of master node construction that is compatible with the conventional SPI. This master node 100 has a switch 121 to switch the enable signal EN# for the serial/parallel converter 102 for receiving. With the switch set to A, the serial/parallel converter 102 operates to receive data when a receiving destination is specified in the receiving destination control register 106, as in the embodiment shown in FIG. 15. With the switch 121 set to B, the serial/parallel converter 102 operates to receive data when a transmitting destination is specified in the transmitting destination control register. That is, at this time transmitting and receiving operations are performed when any transmitting destination(s) is (are) selected in the transmitting destination control register 105. Thus, the operation identical to that of the conventional SPI can be realized by setting the switch 120 of the master node 100 to B and connecting the TXCS1#(13-1) to TXCSn#(13-n) to the CS# terminals of conventional SPI-compatible slave nodes.

Connecting the TXCSi# terminals and the RXCSi# terminals of the slave nodes provided by this invention and connecting those slave nodes to the CS1# to CSn# of a conventional SPI-compatible master node allow for exactly the same operation as a conventional SPI.

The embodiment described above enables communication systems provided by this invention to be compatible with conventional SPIs.

FIG. 19 shows the setting method and communication operation of the TXCS1#(13-1) to TXCSn#(13-n) and the RXCS1#(14-1) to RXCSn#(14-n) with the switch 121 set to B in the embodiment in FIG. 18.

The TXCS1#(13-1) to TXCSn#(13-n) control the receiving operation with the switch 121 set to B. So activating (turning ON) these chip select signals corresponding to two sub-nodes simultaneously is prohibited because RXD signals collide. Therefore, the cases 4, 6, 7, and 8 are prohibited and only the cases 1, 2, 3, and 5 are allowed.

The terminals of RXCS1#(14-1) to RXCSn#(14-n) not used when the switch 120 set to B, can be used as chip-select signals.

That is, when the switch 120 is set to B, the TXCS1#(13-1) to TXCSn#(13-n) can represent the CS1# to CSn#, and the RXCS1#(14-1) to RXCSn#(14-n) can represent the CS(n+1)# to CS(2n)#. So the output pins can be used effectively.

The control of setting the switch 120 to A or B can be also realized by the register 122.

Figure 20:
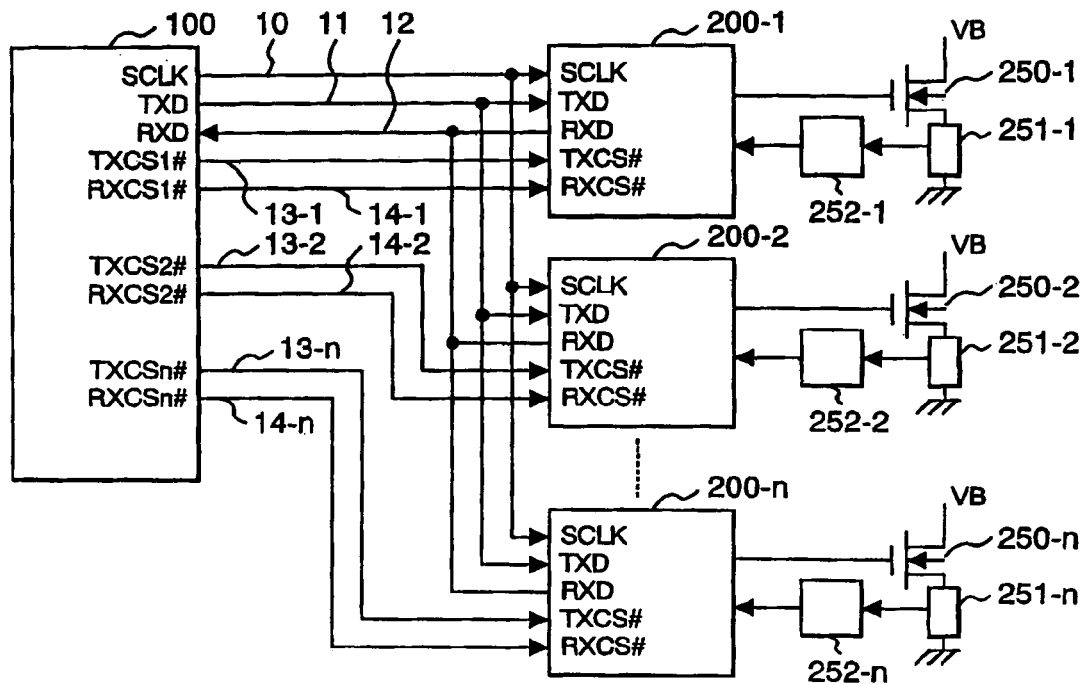
FIG. 20 is a diagram showing an embodiment of an control device according to this invention.

FIG. 20 is a diagram showing an embodiment of a control device according to this invention. In this embodiment, the master node 100 having the MPU as shown in FIG. 16 is used. Semiconductor devices 250-1 to 250-n for output and actuators are respectively connected with slave nodes 200-1 to 200-n to control the respective objects. In this embodiment, the output semiconductor devices 250-1 to 250-n are connected at the power supply VB side of the actuators as high-side drivers. However, it goes without saying that they can be connected at the ground side of the actuators as low-side drivers. Using an H bridge or the like for the output semiconductor devices 250-1 to 250-n is possible. Also, it is possible to contain the output semiconductor device 211 in the slave node as in the embodiments shown in FIGS. 11 and 12.

The actuator can be a solenoid or motor. If the actuator is a motor, when the output semiconductor device is an H bridge, the motor can be rotated reversely by reversing the polarity of voltage applied to it. Although in the embodiment shown in FIG. 20 each of the slave nodes 200-1 to 200-n is connected to one output semiconductor device and one actuator, connecting the slave node to multiple output semiconductor devices and actuators is also possible.

The actuators 251-1 to 251-n control objects 251-1 to 252-n. The states of the controlled objects and the actuators are fed back to the slave nodes 200-1 to 200-n. If the slave nodes 200-1 to 200-n have the MPU 210 as shown in FIG. 10, it is possible to form a feedback control system independent of the master node 100 with only the controlled objects 252-1 to 252-n and the slave nodes 200-1 to 200-n. In this case, the states of the controlled objects or actuators may be fed back via a sensor not shown in the figure. In such a case, it is possible to provide the input circuit 214 or the A/D converter 215 to the slave nodes 200-1 to 200-n as shown in the embodiments in FIGS. 13 and 14.

For example, if the control device in this embodiment controls an automobile engine, the output semiconductor devices 250-1 to 250-n can be used for an H bridge to drive a motor that operates an electronic controlled throttle, an ignition driver to ignite fuel-air mixture in a cylinder, an injector driver for driving an injector that injects fuel in the cylinder or near the inlet of the cylinder in a intake pipe, an EGR valve driver that controls the amount of exhaust gas return-flow, a solenoid driver to control a transmission, and the like. Of these drivers, the ignition driver and the injector driver flow respectively electric currents for a prescribed period of time at a prescribed timing, thereby an ignition timing, ignition energy, injection timing and amount of fuel injection respectively are controlled. The H bridge, the EGR valve driver, and the solenoid driver respectively control driving currents by the PWM (Pulse Width Modulation) to control throttle openings, EGR valve openings, and engagement strengths of a clutch driven with a solenoid. The H bridge further controls the direction of rotation of a motor that operates a throttle valve by controlling the direction of currents. In this case the states of the controlled objects to be fed back include rotation angle of an engine, water temperature, and amount of suction air, and the sensors include a clunk angle sensor a water temperature sensor, and a intake air flow sensor.

When the output semiconductor devices 250-1 to 250-n are for controlling an electric brake, they can be used for an H bridge or a three-phase inverter to drive a motor of the electric brake. In this case, it is preferable to provide the slave nodes 200-1 to 200-n to individual wheels (brake). The states of the controlled objects to be fed back include the pressure (thrust) of a brake pad and wheel rotation speed, and the sensors include a pressure sensor and a wheel rotation speed sensor.

For controlling a suspension comprising electric actuators, the output semiconductor devices 250-1 to 250-n can be used for an H bridge or a half-bridge to drive the electric actuator. In this case, it is also preferable to provide the slave nodes 200-1 to 200-n to individual wheels (suspensions). The states of the controlled objects to be fed back include the position and acceleration of a suspension, and the sensors include a position sensor and an acceleration sensor.

According to the embodiments described above, commands from the master node 100 are transferred to the slave nodes 200-1 to 200-n by the communication system provided by this invention and the slave nodes can control the actuators 251-1 to 251-n via the output semiconductor devices 250-1 to 250-n based on the commands from the master node 100. Also, since the commands from the master node can be broadcast to the slave nodes 200-1 to 200-n, it is possible to reduce the transmission time of the commands.

On the other hand, various information can be transferred from the slave nodes 200-1 to 200-n to the master node 100 by the communication system provided by this invention. Such information includes the states of the actuators and the controlled objects that are input from sensors not shown in the figure, the diagnosis results (over current detection, short circuit detection, broken wire detection, and overheat detection) at the output semiconductor devices 250-1 to 250-n, and the states of the slave nodes 200-1 to 200-n (processing and control errors, state transition information, etc.).

Figure 21:
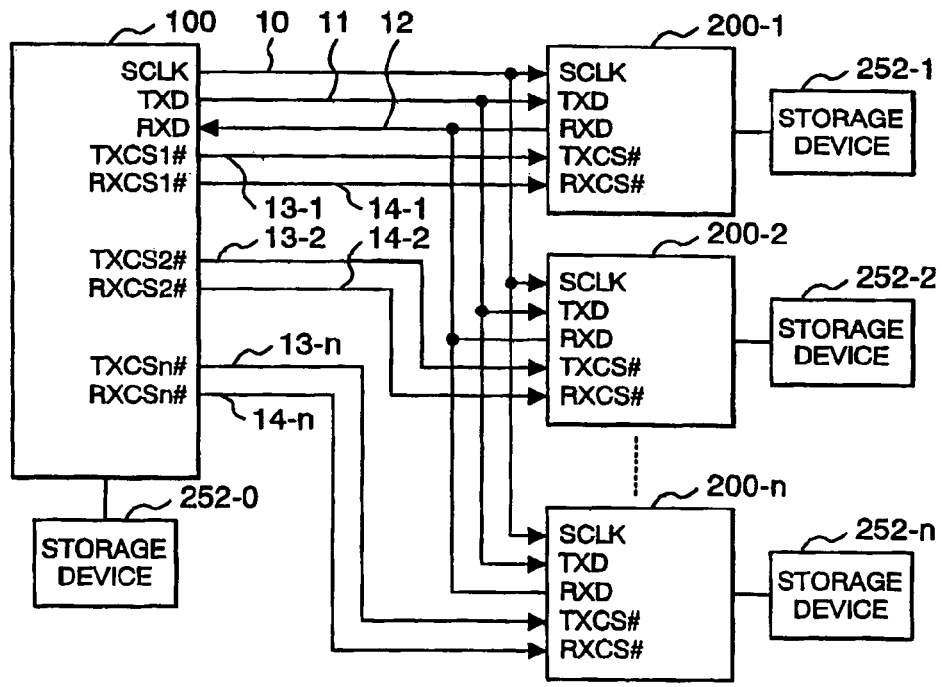
FIG. 21 is a diagram showing an embodiment of an information processing system according to this invention.

FIG. 21 shows an embodiment of an information processing system according to this invention. In this embodiment, the master node 100 equipped with the MPU as shown in FIG.

16 and the slave nodes having the MPU as shown in FIG. 10, are used. A storage device 252-0 is connected to the master node 100 and storage devices 252-1 to 252-n are connected to the slave nodes 200-1 to 200-n. For the storage devices 252-1 to 252-n ordinary semiconductor memory and magnetic disk units can be used.

Individual master node 100 and slave nodes 200-1 to 200-n perform allocated processing using the storage devices 252-0 to 252-n connected to themselves. Required information can be exchanged between master node and slave nodes via the communications system of this invention, so achieving an integrated operation in total. Particularly, the communications system enables the broadcasting of information from the master node 100 to the slave nodes 200-1 to 200-n, and the simultaneous transmitting and receiving to and from different nodes. Thus, communications-efficiency for information exchange between nodes can be increased.

For example, if transferring information, such as numeric values to be used for arithmetic operations performed by individual slave nodes and arithmetic operation types, from the master node 100 to the slave nodes 200-1 to 200-n; and if transferring Information such as arithmetic operation results and status of the arithmetic operation (operating, completed, error, etc.) from the slave nodes 200-1 to 200-n to the master node 100, high-performance processing can be realized as a distribute processing system as a whole.

Figure 22:
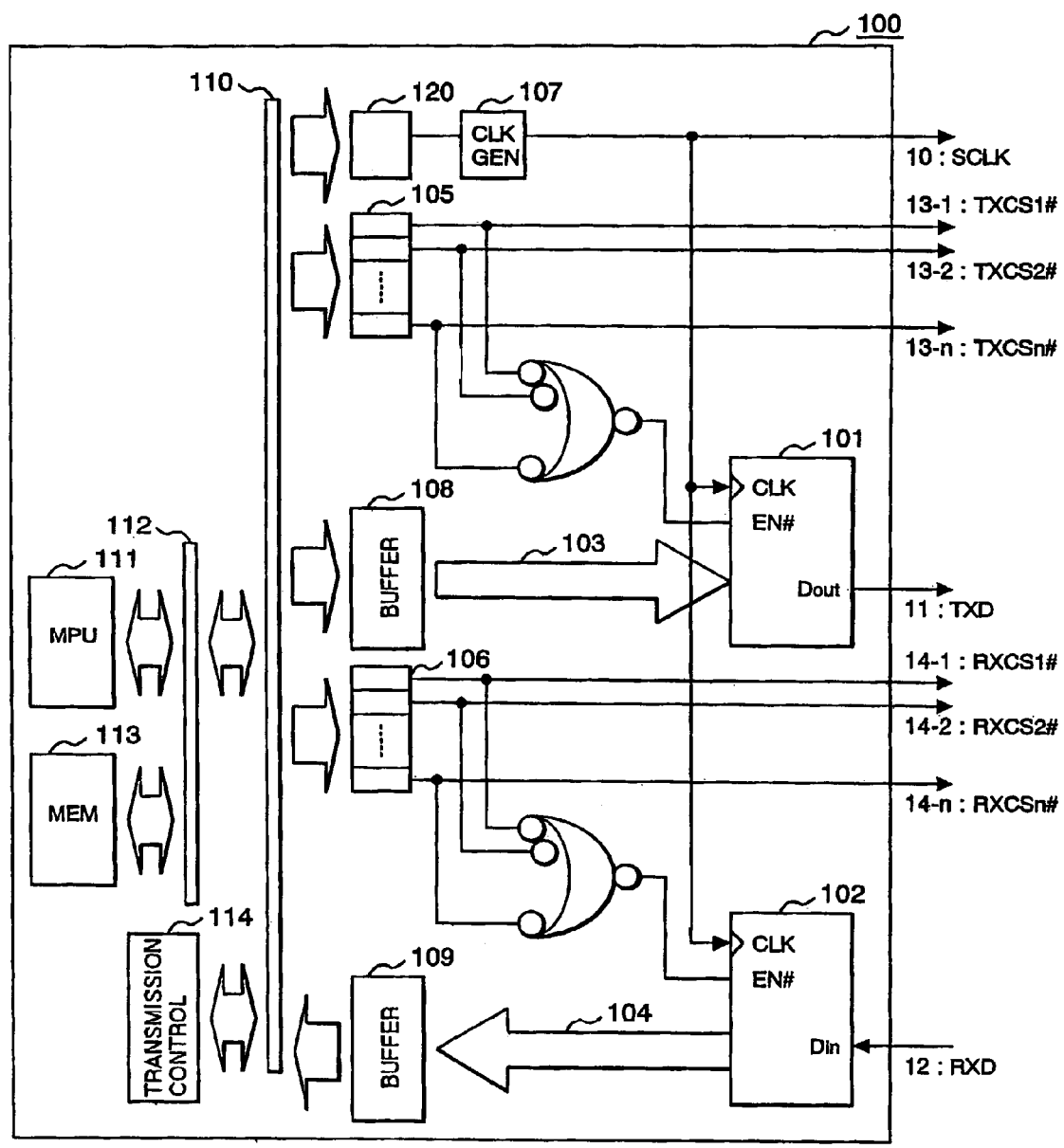
FIG. 22 is a diagram showing an embodiment of a master node having an advance receiving capability.

FIG. 22 shows an embodiment of a master node equipped with an advance receiving capability. The master node 100 in this embodiment has a transfer control circuit 114 and transfers received data 104 to memory 113. If there is no communication request from an MPU 111, transfer control circuit 114 sets a receiving destination control register 106 in the background, sets a communication start register 120 to receive data from a slave node, and transfers the received data 104 to the memory 113. The receiving destination register 106 is a register to specify whether or not the individual slave nodes 200-1 to 200-n are to be selected for communication partner (transfer from slave node to master node). This register is set so that only one slave node is selected as a source for receiving and the other slave nodes are not selected in order to prevent the contention of receiving data.

Since the memory 113 is connected to a bus 112 that is higher than the bus 110, access time from the MPU 111 can be reduced, improving the processing performance of the MPU 111.

Figure 23A:
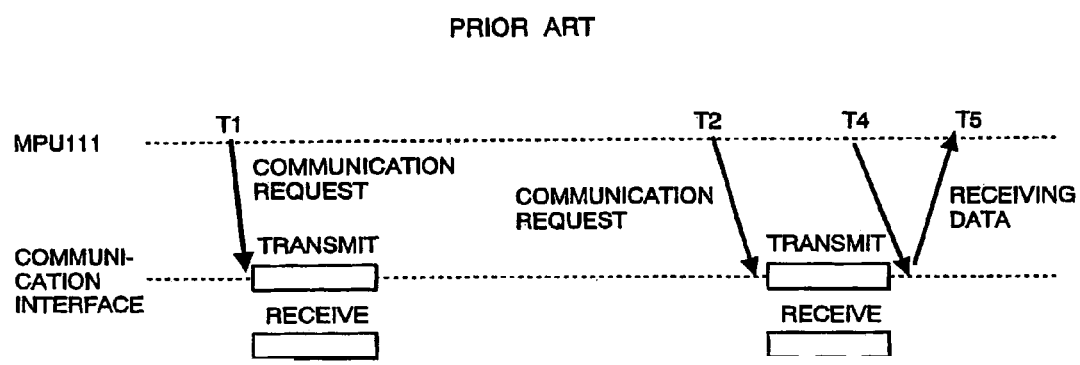
FIGS. 23A and 23B are schematic diagrams showing the operation of the advance receiving capability.
Figure 23B:
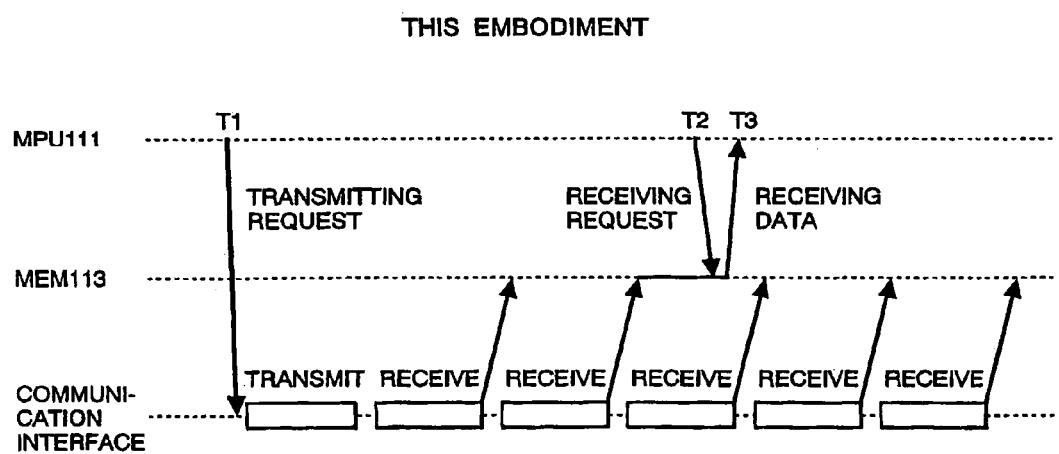

The operation of the advance receiving capability compared with the prior art will be described in reference to FIGS. 23A and 23B. FIG. 23A shows the prior art and FIG. 23B shows this embodiment. According to this embodiment, the transfer control circuit 114 issues a receiving request to the communications interface in the background and the communications interface performs a receiving operation after the MPU 111 issued a transmitting request at time T1 and a transmitting operation is finished at the communications interface, as shown in FIG. 23B. When the receiving operation is finished, the receiving result data is transferred to the memory 113 by the transfer control circuit 114. If the MPU 111 requires the receiving data at time T2, it issues a receiving request in the form of a read access to the memory 113 and obtains the receiving data at time. T3. The period from time T2 to time T3 can be reduced to the time required to access the memory 113.

In contrast, with the prior art, the communications interface performs both transmitting and receiving operations to a communication request at time 2 as shown in FIG. 23.A, and after these communication operations are finished it accesses a buffer 109 at time T4 and obtains a receiving data at time T5. The period from time T2 to time T5 is much longer than that from T2 to T3 due to additional communication operation at the communications interface, and also the access time to the buffer 109 is normally longer than the access time to the memory 113, because of which the period from time T4 to time T5 become longer than that from T2 to T3.

For example, for the case where the slave nodes shown in the embodiments in FIGS. 11 and 12 are connected, with the prior art the following process is required in order to obtain the results of diagnosis of the output semiconductor device 211. First, as shown in FIG. 23A, the communications interface performs communication of both transmitting and receiving in response to a communication request at T2 and, upon completion of these communication operations are finished, accesses the buffer 109 at time T4 and obtain the diagnosis results at time T5. In contrast, as shown in FIG. 23B, this invention enables fast realization of a diagnosis capability concerning the output control by reading in the diagnosis results to the memory 113 in advance by means of the transfer control circuit 114.

In many control systems, for controlling the objects, it is necessary that the MPU 11 executes a feed back of the states of the controlled objects or actuators and executes the arithmetic operations to obtain appropriate outputs based on the fed back information. In this case, with the prior art, the following process is necessary in order to obtain the data required to calculate output values. First, as shown in FIG. 23A, the communications interface performs communication operation including both transmitting and receiving in response to a communication request at time T2 and then, upon completion of these communication operations, accesses the buffer at time T4 to read the input data at time T5. In contrast, as shown in FIG. 23B, in this invention it is possible for the MPU 111 to calculate the output values based on the input data by reading in the input data to the memory 113 in advance using the transfer control circuit 114. Thereby, the speed of control operations is increased.

With the prior art, when receiving data, it is required to transmit a signal for receiving data to the source. Therefore, in the prior art, if receiving the data in the background as in this embodiment, it is necessary to prepare some transmitting data having no side effects. It accordingly becomes a big obstacle to fast control operation. In this invention, however, receiving operation can be performed independently.

Figure 24:
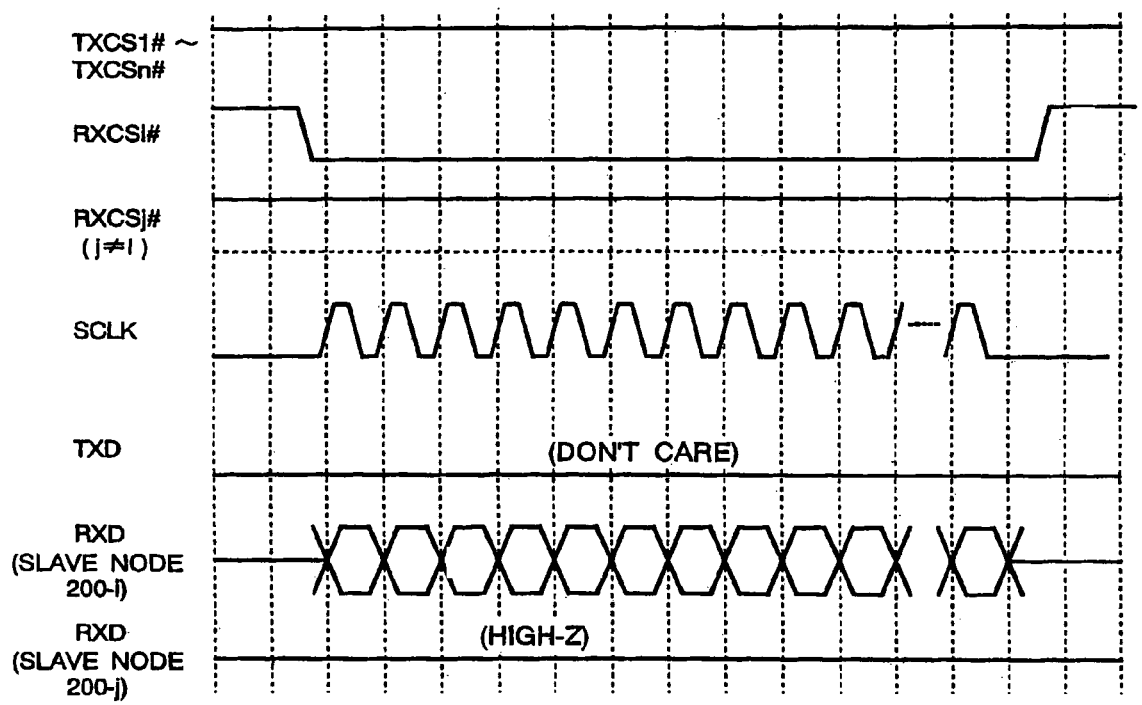
FIG. 24 is a diagram showing the waveforms of individual signals concerning the advance receiving capability.

FIG. 24 is a diagram showing examples of the waveforms of individual signals concerning the receiving in the background in the embodiments in FIGS. 22, 23A and 23B. This figure shows a case where the TXCS1#(13-1) to TXCSn#(13-n) are all at "H" level, or inactive, and only the RXCSi#(14-i) of the RXCS1#(13-1) to RXCSn#(14-n) is active ("L"), the other signals being inactive.

At this time, the transmitted data TXD11 is ignored at all the slave nodes 200-1 to 200-n. Only the slave node 200-1 outputs the RXD12 at the leading edge of the SCLK10 and the other slave nodes do not output and become high-impedance state. In this invention, the master node can receive data from a particular slave node 200-i. Also, since the transmitting data TXD11 is ignored, it is not necessary to transmit dummy data for receiving data. Furthermore, noises due to the transmitting of dummy data will not occur, thus reducing the generation of noises in total.

According to the embodiments shown in FIG. 22 to 24, processing performance of the MPU 111 can be improved because receiving data is read into the memory 113 in advance.

Figure 25:
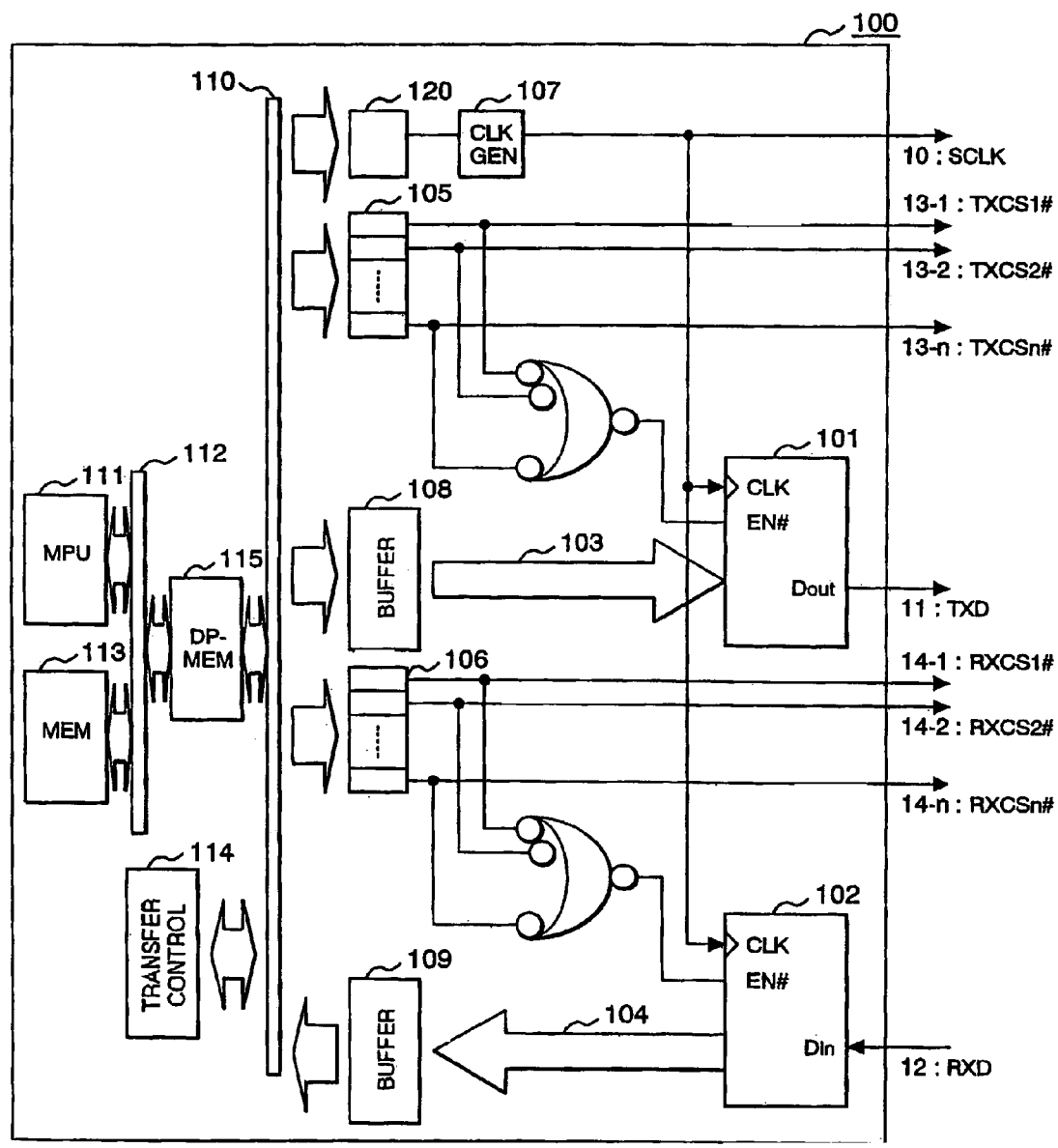
FIG. 25 is a diagram showing an embodiment of a master node having the advance receiving capability and a dual port memory.

FIG. 25 shows an example of the construction of a master node having an advance receiving capability. The master node 100 in this embodiment is equipped with dual port memory 115 in stead of the memory 113. A transfer control circuit 114 sets a receiving destination control register 106 in the background if there is no communication request from the MPU 111, sets a communication start register 120 to receive data from a slave node and then transfer received data 104 to the dual port memory 115. As with the embodiment in FIG. 22, the receiving destination register 106 is the register that specifies a particular slave node of the slave nodes 200-1 to 200-$n$ to select as the source for receiving data (transfer from the slave node to the master node), and is set so that only one slave node is selected and the other slave nodes not selected to prevent a contention of receiving data. The dual port memory 115 is connected to a fast bus 112 as well as a bus 110, which reduces access time from the MPU 111 and thereby improves the processing performance of the MPU 111. Furthermore, since the bus 112 is not occupied by the data transfer by the transfer control circuit, the operations of the MPU 111, such as access to the MEM 113, are not blocked, resulting in further improvement of the processing performance.

Figure 26:
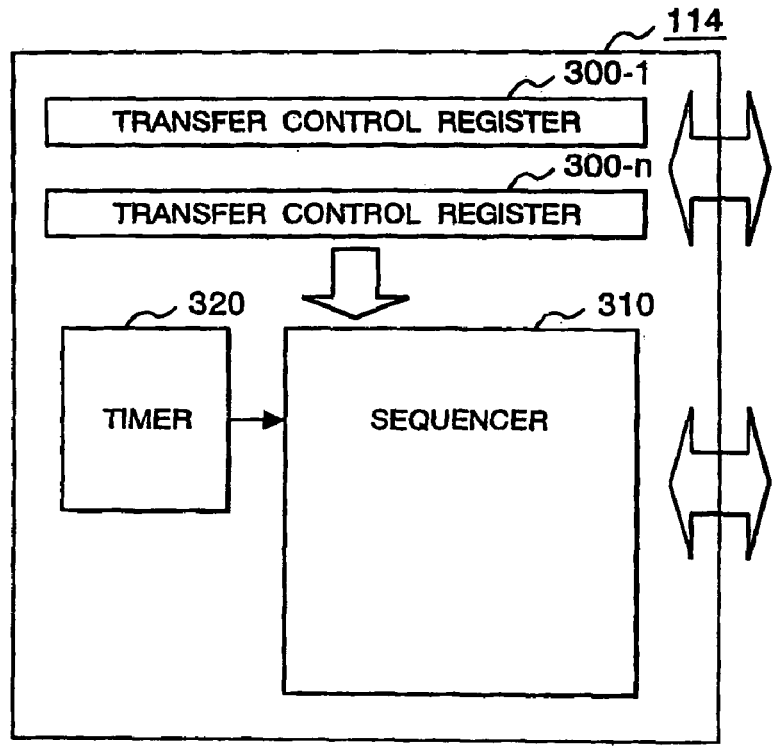
FIG. 26 is a diagram showing an embodiment of a transfer control circuit.

FIG. 26 is an embodiment of a transfer control circuit 144. The transfer control circuit comprises transfer control registers 300-1 to 300-$n$, a sequencer 310, and a timer 320. The transfer control registers 300-1 to 300-$n$ are registers that control the advance deceiving capability and are set by the MPU 111. As shown in the figure, the transfer control registers circuit 144 can contain a plurality of the transfer control registers. The sequencer 310 sets a receiving destination control register 106 and a communication start register 120 to receive data from a slave node and then transfers the received data 104 to the dual port memory 115 according to the transfer control registers 300-1 to 300-$n$. The timer 320 controls advance receiving period and it is desirable that the transfer control circuit 144 have this timer. However, it can be replace with another timer signal.

Figure 27:
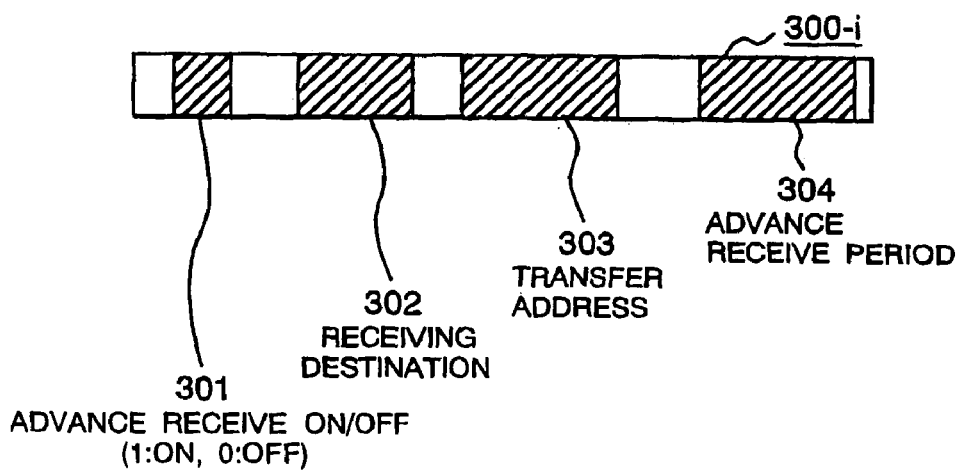
FIG. 27 is a diagram showing an embodiment of a transfer control register.
Figure 28:
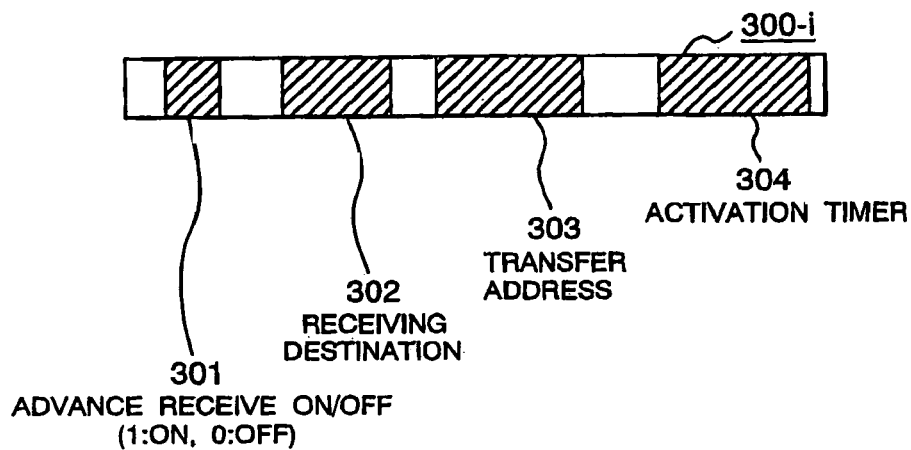
FIG. 28 is a diagram showing another embodiment of the transfer control register.

FIG. 27 shows an embodiment of the information to be set in individual transfer register 300-1 to 300-$n$. The individual transfer control register 300-$i$ has an advance receiving ON/OFF field 301, a receiving destination field 302, a transfer address field 303, and an advance receiving period or activation timer field 304. The advance receiving ON/OFF field 301 specifies whether or not to perform advance receiving, that is, the advance receiving capability can be activated or stopped by setting this field. The receiving destination field 302 specifies a slave node to be selected as a source for receiving data (transfer from master node to slave node) from among the slave nodes 200-1 to 200-$n$. The transfer control circuit 144 sets the receiving destination control register 106 according to the setting of this field. The transfer address field 303 indicates the address on the memory 113 or dual port memory 115 to which received data is transferred. The advance receiving period field 304 is for setting the advance receiving period. If the transfer control circuit 144 contains the timer 320 as in the embodiment shown in FIG. 25 the advance receiving field 304 sets the activation signal period from the timer 320, and the transfer control circuit 144 sets the communication start register 120 with an activation signal from the timer 320 to perform an advance receiving operation. If activation signals are obtained from a timer external to the transfer control circuit 144, then the activation timer field 304 is provided as shown in FIG. 28 and the communication start register 120 is set with an activation signal specified in this field to perform an advance receiving operation. In this case, the advance receiving period is set by the control register for the timer specified in the activation timer field.

Figure 29:
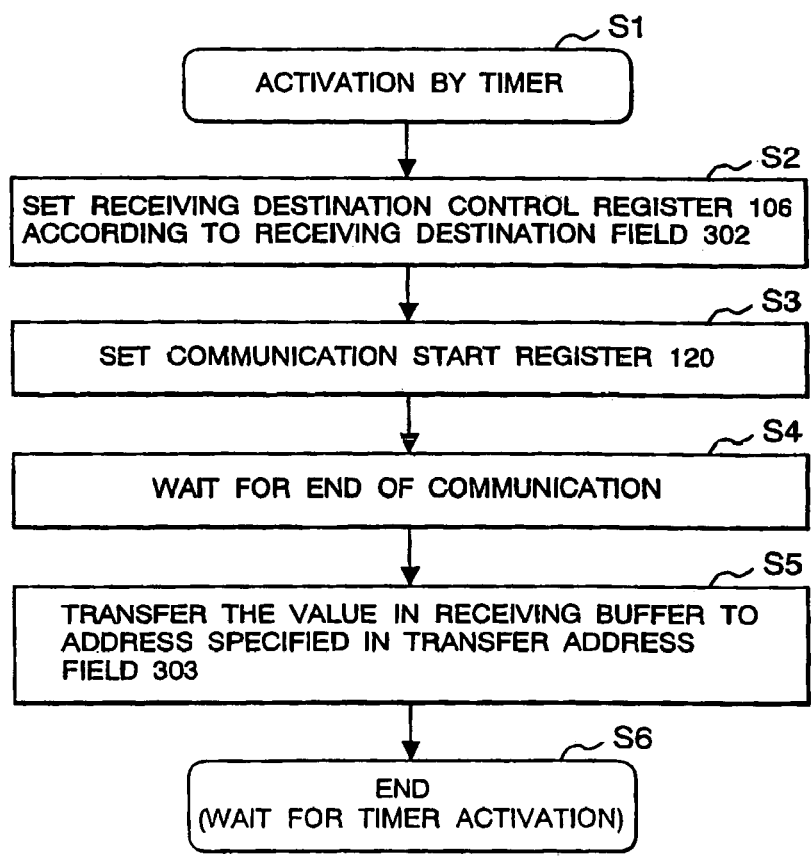
FIG. 29 is a diagram showing an embodiment of the operation of the transfer control circuit.

FIG. 29 is a flowchart showing an embodiment of the operation of the transfer control circuit 144. First, the operation of the transfer control circuit 144 is activated by the timer (S1). Then, the receiving destination control register 106 is set according to the receiving destination field 302 (S2). At this stage, an active signal is output to one of the RXCS1# (14-1) to RXCSn#(14-$n$) according to the setting of the receiving control register 106. Then, the communication start register 120 is set (S3). At this stage, the SCLK10 is output, and the data RXD12 is output from the slave node specified by the RXCS1#(14-1) to RXCSn#(14-$n$). Waiting until, the communication is finished (S4), the value in the receiving buffer is transferred to the address specified in the transfer address field 303 (S5). Thereby, the received data is stored in the memory 113 or the dual port memory 115 (S6) and the transfer control circuit 144 finishes the operation (S6) and wait for activation by the timer.

The above-mentioned master node and slave nodes may take a number of forms, for example, it is possible that the master node and the slave nodes separately are made of individual substrate, and the substrate having a master node function and each substrate having a slave node function are connected through a cable including respective signal lines. Furthermore, other function can be provided on these substrates in addition to the master node and slave nodes. Such a system configuration can have more of the same effects.

According to this invention, a plurality of slave nodes can receive simultaneously signals from a master node, and there is no collision of signals transferred from a plurality of slave nodes to a master node. It enables the realization of a broadcasting capability. Also, according to this invention it is possible to operate the transmitting function and the receiving function independently. Furthermore, according to this invention, when a microprocessor needs received data, it can continue the processing by reading in the data that has been transferred in advance, which improves microprocessor performance.

What is claimed is:

1. A communications system having a single master node and a plurality of slave nodes and performing communications between said master node and said slave nodes,
   wherein said master node comprises:
   clock transmitting means for outputting a clock signal to said slave nodes;
   means for outputting a first communication selection signal group to said slave nodes, said first communication selection signal group comprising a plurality of signals indicating which of said slave nodes are individually selected as receiving-end communication partners for receiving data from said master node;
   means for outputting a second communication selection signal group to said slave nodes, said second communication selection signal group comprising a plurality of signals indicating which of said slave nodes is selected as a transmitting-end communication partner for transmitting data to said master node, said signals of said second communication selection signal group selecting no more than one slave node at a time, wherein signals of said first and second communication selection signal group are output simultaneously and in parallel from said single master node to said selected slave nodes;
   means for transmitting master node-issued data to said slave nodes selected as said receiving-end communication partners, in sync with said clock signal via a first common line between said master node and said slave nodes;
   means for taking in slave node-issued data from the one slave node selected as said transmitting-end communication partner via a second common line between said master node and said slave nodes after said master node-issued data is transmitted to said slave nodes selected as said receiving-end communication partners, wherein said slave node-issued data is received from the one slave node in sync with said clock signal;

an arithmetic unit;

a storage device; and transfer means for transferring data from said slave node selected as said transmitting-end communication partner to said storage device.

2. The communications system according to claim 1, wherein:

said master node and said slave nodes comprise separate individual substrates, and the substrate having the master node function and each substrate having the slave node function are connected together through signal lines.

3. A control device that includes a single master node, a plurality of slave nodes, actuators connected to said slave nodes via a switching means, and a communications system that performs communications between said master node and said slave nodes, and controls said actuators with commands from said slave nodes, wherein said master node comprises:

clock transmitting means for outputting a clock signal to said slave nodes;

means for outputting a first communication selection signal group to said slave nodes, said first communication selection signal group comprising a plurality of signals indicating which of said slave nodes are individually selected as receiving-end communication partners for receiving data from said master node;

means for outputting a second communication selection signal group to said slave nodes, said second communication selection signal group comprising a plurality of signals indicating which of said slave nodes is selected as a transmitting-end communication partner for transmitting data to said master node, said signals of said second communication selection signal group selecting no more than one slave node at a time, wherein signals of said first and second communication selection signal group are output simultaneously and in parallel from said single master node to said selected slave nodes;

means for transmitting master node-issued data to said slave nodes selected as said receiving-end communication partners, in sync with said clock signal via a first common line between said master node and said slave nodes;

means for taking in slave node-issued data from the one slave node selected as said transmitting-end communication partner via a second common line between said master node and said slave nodes after said master node-issued data is transmitted to said slave nodes selected as said receiving-end communication partners, wherein said slave node-issued data is received from the one slave node in sync with said clock signal;

an arithmetic unit a storage device; and transfer means for transferring data from said slave node selected as said transmitting-end communication partner to said storage device.

4. The control device according to claim 3, wherein:

said master node and said slave nodes comprise separate individual substrates; and the substrate having the master node function and each substrate having the slave node function are connected together through signal lines.

5. An information processing system comprising a single master node that has a microprocessor and performs information processing, a plurality of slave nodes which have microprocessors respectively and perform information processing, and a communications system that performs communications between said master node and slave nodes, wherein said master node further comprises:

clock transmitting means for outputting a clock signal to said slave nodes;

means for outputting a first communication selection signal group to said slave nodes, said first communication selection signal group comprising a plurality of signals indicating which of said slave nodes are individually selected as receiving-end communication partners for receiving data from of said master node;

means for outputting a second communication selection signal group to said slave nodes, said second communication selection signal group comprising a plurality of signals indicating which of said slave nodes is selected as a transmitting-end communication partner for transmitting data to said master node, said signals of said second communication selection signal group selecting no more than one slave node at a time, wherein signals of said first and second communication selection signal group are output simultaneously and in parallel from said single master node to said selected slave nodes;

means for transmitting master node-issued data to said slave nodes selected as said receiving-end communication partners, in sync with said clock signal via a first common line between said master node and said slave nodes;

means for taking in slave node-issued data from the one slave node selected as said transmitting-end communication partner via a second common line between said master node and said slave nodes after said master node-issued data is transmitted to said slave nodes selected as said receiving-end communication partners, wherein said slave node-issued data is received from the one slave node in sync with said clock signal;

an arithmetic unit;

a storage device; and transfer means for transferring data from said one slave node selected as said transmitting-end communication partner to said storage device.

6. The information processing system according to claim 5, wherein:

said master node and said slave nodes comprise separate individual substrates, and the substrate having the master node function and each substrate having the slave node function are connected together through signal lines.

7. A microprocessor that makes up a master node connected to a plurality of slave nodes, comprising:

clock transmitting means for outputting a clock signal to said slave nodes;

means for outputting a first communication selection signal group to said slave nodes, said first communication selection signal group comprising a plurality of signals indicating which of said each slave nodes are individually selected as receiving-end communication partners for receiving data from said master node;

means for outputting a second communication selection signal group to said slave nodes, said second communication selection signal group comprising a plurality of signals indicating which of said slave nodes is selected as a transmitting-end communication partner for transmitting data to said master node, said signals of said second communication selection signal group selecting no more than one slave node at a time, wherein signals of said first and second communication selection signal group are output simultaneously and in parallel from said single master node to said selected slave nodes;

means for transmitting master node-issued data to said slave nodes selected as said receiving-end communication partners, in sync with said clock signal via a first common line between said master node and said slave nodes; and means for taking in slave node-issued data from a single slave node selected as said transmitting-end communication partner via a second common line between said master node and said slave nodes after said master node-issued data is transmitted to said slave nodes selected as said receiving-end communication partners, wherein said slave node-issued data is received from the one slave node in sync with said clock signal.

8. The microprocessor according to claim 7, further comprising:
an arithmetic unit;
a storage device; and
transfer means for transferring data from said selected slave node to said storage device.

9. A slave node for a communication system having a single master node and a plurality of slave nodes and performing communications between said master node and said slave nodes,
wherein said master node includes:
clock transmitting means for outputting a clock signal to said slave nodes;
means for outputting a first communication selection signal group to said slave nodes, said first communication selection signal group comprising a plurality of signals indicating which of said each slave nodes are individually selected as receiving-end communication partners for receiving data from said master node;
means for outputting a second communication selection signal group to said slave nodes, said second communication selection signal group comprising a plurality of signals indicating which said slave nodes is selected as a transmitting-end communication partner for transmitting data to said master node, said signals of said second communication selection signal group selecting no more than one slave node at a time, wherein signals of said first and second communication selection signal group are output simultaneously and in parallel from said single master node to said selected slave nodes;
means for transmitting master node-issued data to said slave nodes selected as said receiving-end communication partners, in sync with said clock signal via a first common line between said master node and said slave nodes;
means for taking in slave node-issued data from a single slave node selected as said transmitting-end communication partner via a second common line between said master node and said slave nodes after said master node-issued data is transmitted to said slave nodes selected as said receiving-end communication partners, wherein said slave node-issued data is received from the one slave node in sync with said clock signal;
an arithmetic unit;
a storage device; and
transfer means for transferring data from said slave node selected as said transmitting-end communication partner to said storage device,
wherein said slave node includes:
input terminals for receiving one of said signals for selecting said receiving-end communication partner and for receiving one of said signals for selecting said transmitting-end communication partner, respectively;
means for taking in data from said master node in sync with said clock signal when said slave node is selected as said receiving-end communication partner; and
means for outputting data from said slave node to said master node, in sync with said clock signal, when said slave node is selected as said transmitting-end communication partner.

10. The slave node according to claim 9, wherein:
said slave node includes a power semiconductor device for output; and
said power semiconductor device is controlled by the data transmitted by said master node.

11. The slave node according to claim 10, wherein said means for outputting data outputs diagnosis results concerning said power semiconductor device to said master node in sync with said clock signal when said communication selection signal group has selected the slave node as a communication partner of transferring data to said master node.

12. The slave node according to claim 9, wherein:
said slave node has an input circuit that takes in external signals; and
said means for outputting data outputs signals taken in with said input circuit to said master node, in sync with said clock signal, when said communication selection signal group has selected the slave node as a communication partner for transferring data to said master node.

13. The slave node according to claim 12, wherein said input circuit is controlled by the data transmitted from said master node.

14. The slave node according to claim 12, wherein said input circuit is an analog/digital converter.

15. The slave node according to claim 12, wherein said input circuit is a latch circuit.

16. The slave node according to claim 12, wherein said input circuit is a noise filter.

17. The slave node according to claim 12, wherein said input circuit is a multiplexer.

18. The slave node according to claim 12, wherein said slave node comprises a substrate.

* * * * *